US011005296B2

(12) United States Patent
Kanno

(10) Patent No.: US 11,005,296 B2
(45) Date of Patent: May 11, 2021

(54) ELECTRODE UNIT, POWER TRANSMITTING DEVICE, POWER RECEIVING DEVICE, ELECTRONIC DEVICE, VEHICLE, AND WIRELESS POWER TRANSMISSION SYSTEM

(71) Applicant: Panasonic Intellectual Property Management Co., Ltd., Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 229 days.

(21) Appl. No.: 15/996,459

(22) Filed: Jun. 2, 2018

(65) Prior Publication Data

US 2018/0358842 A1    Dec. 13, 2018

(30) Foreign Application Priority Data

Jun. 7, 2017  (JP) .............................. JP2017-112572
Mar. 26, 2018  (JP) ................................ 2018-058115

(51) Int. Cl.
*H02J 50/05* (2016.01)
*H02J 50/12* (2016.01)
(Continued)

(52) U.S. Cl.
CPC .............. *H02J 50/12* (2016.02); *H02J 7/025* (2013.01); *H02J 50/05* (2016.02); *H02J 50/70* (2016.02); *H02J 50/80* (2016.02)

(58) Field of Classification Search
CPC ..................................................... H02J 50/12
(Continued)

(56) References Cited

U.S. PATENT DOCUMENTS 10,153,664 B2 * 12/2018 Matsumoto ............. H02J 50/80
2012/0038223 A1    2/2012 Harakawa et al.
(Continued)

FOREIGN PATENT DOCUMENTS

EP    2782214 A1    9/2014
EP    3203603 A1    8/2017
(Continued)

OTHER PUBLICATIONS

Extended European Search Report dated Oct. 22, 2018 for European Application No. 18176230.3.

*Primary Examiner* — Rexford N Barnie
*Assistant Examiner* — Dru Parries
(74) *Attorney, Agent, or Firm* — Renner, Otto, Boisselle & Sklar, LLP

(57)    ABSTRACT

An electrode unit is used in a power transmitting device or a power receiving device of a wireless power transmission system based on an electric field coupling method. The electrode unit includes: a first electrode to which a first voltage is applied when power is transferred; a second electrode to which a second voltage antiphase to the first voltage is applied when power is transferred; and a third electrode spaced apart from the first and second electrodes, the third electrode having a third voltage whose amplitude is less than amplitudes of the first and second voltages when power is transferred. The first and second electrodes are arranged along an electrode installation plane. At least a portion of the third electrode does not overlap the first and second electrodes as viewed from a direction perpendicular to the electrode installation plane.

20 Claims, 26 Drawing Sheets

(51) Int. Cl.
*H02J 50/70* (2016.01)
*H02J 50/80* (2016.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 2014/0111154 A1* | 4/2014 | Roy | B60L 53/124 |
| | | | 320/108 |
| 2014/0175906 A1 | 6/2014 | Suesada et al. | |
| 2014/0306552 A1 | 10/2014 | Goma et al. | |
| 2014/0354084 A1 | 12/2014 | Takahashi et al. | |
| 2015/0249366 A1 | 9/2015 | Takikawa et al. | |
| 2015/0326033 A1 | 11/2015 | Ichikawa et al. | |
| 2015/0372505 A1 | 12/2015 | Takahashi | |
| 2016/0294217 A1* | 10/2016 | Mi | H02J 7/025 |
| 2016/0315504 A1 | 10/2016 | Ichikawa | |

FOREIGN PATENT DOCUMENTS

| | | | |
|---|---|---|---|
| JP | 2010193692 A | 9/2010 | |
| JP | 2012175869 A | 9/2012 | |
| WO | 2012157011 A1 | 11/2012 | |
| WO | 2013168307 A1 | 11/2013 | |
| WO | 2014049750 A1 | 4/2014 | |
| WO | 2014132518 A1 | 9/2014 | |

\* cited by examiner

US 11,005,296 B2

ELECTRODE UNIT, POWER TRANSMITTING DEVICE, POWER RECEIVING DEVICE, ELECTRONIC DEVICE, VEHICLE, AND WIRELESS POWER TRANSMISSION SYSTEM

BACKGROUND

1. Technical Field

The present disclosure relates to an electrode unity a power transmitting device, a power receiving device, an electronic device, a vehicle, and a wireless power transmission system.

2. Description of the Related Art

In recent years, wireless power transmission techniques have been developed for transmitting electric power wirelessly, i.e., in a contactless manner, to devices that are capable of moving or being moved, e.g., mobile phones and electric vehicles. The wireless power transmission techniques include methods based on electromagnetic induction and methods based on electric field coupling. Among these, a wireless power transmission system based on the electric field coupling method is such that, AC power is transferred wirelessly from a pair of power transmitting electrodes to a pair of power receiving electrodes, with the pair of power transmitting electrodes and the pair of power receiving electrodes opposing each other. For example, such a wireless power transmission system based on the electric field coupling method is used in applications where electric power is transferred to a load from a pair of power transmitting electrodes on or under a road surface or a floor surface. Japanese Laid-Open Patent Publication No. 2010-193692 and Japanese Laid-Open Patent Publication No. 2012-175869 disclose an example of such a wireless power transmission system based on the electric field coupling method.

SUMMARY

With conventional wireless power transmission based on the electric field coupling method, an electric field leakage may occur around the pair of power transmitting electrodes or the pair of power receiving electrodes, thereby causing nearby electronic devices to malfunction. The present disclosure provides a technique with which it is possible to suppress the electric field leakage around power transmitting electrodes or power receiving electrodes.

In order to solve the problem described above, an electrode unit according to an embodiment of the present disclosure is:

an electrode unit for use in a power transmitting device or a power receiving device of a wireless power transmission system, based on an electric field coupling method, the electrode unit including:

a first electrode to which a first voltage is applied when power is transferred;

a second electrode to which a second voltage is applied, when power is transferred, wherein the second voltage has a phase that is different from a phase of the first voltage by a value greater than 90 degrees and less than 270 degrees; and a third electrode spaced apart from the first and second electrodes, the third electrode having a third voltage whose amplitude is less than amplitudes of the first and second voltages when power is transferred, wherein:

the first, and second electrodes are arranged along an electrode installation plane; and at least a portion of the third electrode does not overlap the first and second electrodes as viewed from a direction perpendicular to the electrode installation plane.

These general or specific aspects may be implemented using a system, a method, an integrated circuit; a computer program or a storage medium, or any combination of systems, devices, methods, integrated circuits, computer programs, and storage media.

With the technique of the present disclosure, it is possible to suppress the electric field leakage around power transmitting electrodes or power receiving electrodes, and reduce the risk of causing nearby electronic devices to malfunction.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 12A is a diagram showing an example in which the third electrode 520 is arranged in the vicinity of only one power transmitting electrode 120a.

FIG. 12C is a diagram showing an example in which the third electrode 520 is arranged in the vicinity of only one power receiving electrode 220a.

FIG. 12E is a diagram showing an example in which the third electrode 520 is arranged in the vicinity of one power transmitting electrode 120b and in the vicinity of one power receiving electrode 220a.

FIG. 12G is a diagram showing an example in which the third electrode 520 is arranged in the vicinity of both of the power transmitting electrodes 120a and 120b and in the vicinity of one power receiving electrode 220a.

DETAILED DESCRIPTION (Findings which are Basis of Present Disclosure)

Findings which, are the basis of the present disclosure will be described before describing embodiments of the present disclosure.

Figure 1:
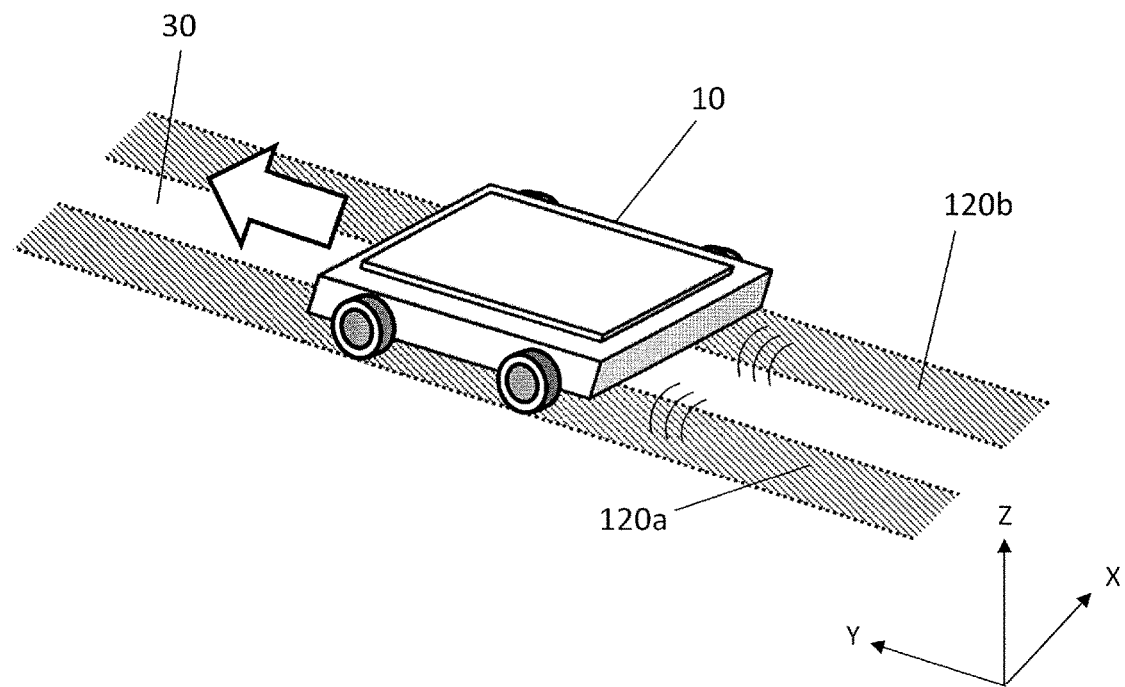
FIG. 1 is a diagram schematically showing an example of a wireless power transmission system based on the electric field coupling method.

FIG. 1 is a diagram schematically showing an example, of a wireless power transmission system based on the electric field coupling method. The "electric field coupling method" refers to a method of power transfer in which electric power is wirelessly transferred from a group of power transmitting electrodes including a plurality of power transmitting electrodes to a group of power receiving electrodes including a plurality of power receiving electrodes via an electric field coupling (hereinafter referred to also as "a capacitive coupling") between the group of power transmitting electrodes and the group of power receiving electrodes. The illustrated wireless power transmission system is a system for wirelessly transferring electric power to a transport robot 10 such as an automated guided vehicle (AGV) used for transporting articles inside a factory, for example. In this system, a pair of flat plate-shaped power transmitting electrodes 120a and 120b are arranged on a floor surface 30. The transport robot 10 includes a pair of power receiving electrodes opposing the pair of power transmitting electrodes 120a and 120b. The transport robot 10 uses the pair of power receiving electrodes to receive AC power transmitted from the power transmitting electrodes 120a and 120b. The received power is supplied to a load of the transport robot 10, such as a motor, a secondary battery or a capacitor for storing electricity. Thus, the transport robot 10 is driven or charged.

FIG. 1 shows XYZ coordinates representing the X, Y and Z directions that are orthogonal to each other. The illustrated XYZ coordinates will be used in the following description. The Y direction denotes the direction in which the power transmitting electrodes 120a and 120b extend, the Z direction denotes the direction that is perpendicular to the surface of the power transmitting electrodes 120a and 120b, and the X direction denotes the direction perpendicular to the Y direction and the Z direction. The X direction is the direction in which the power transmitting electrodes 120a and 120b are arranged next to each other. Note that the directions of structures shown in the figures of the present application are determined in view of the ease of understanding of the description herein, and they do not in any way limit directions to be used when actually carrying out any embodiment of the present disclosure. Also, the shape and size of the whole or part of any structure illustrated in the figures do not limit the actual shape and size thereof.

Figure 2:
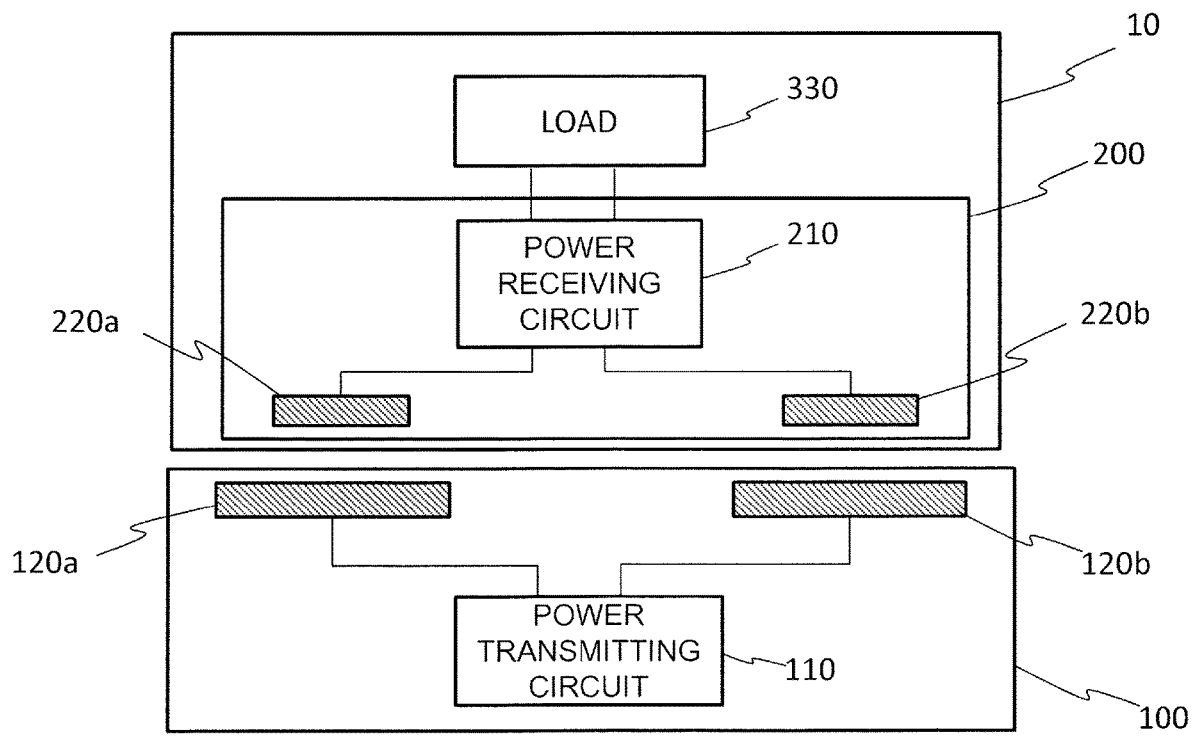
FIG. 2 is a diagram showing a general configuration of the wireless power transmission system shown in FIG. 1.

FIG. 2 is a diagram showing a general configuration of the wireless power transmission system shown in FIG. 1. The wireless power transmission system includes a power transmitting device 100 and the transport robot 10. The power transmitting device 100 includes the pair of power transmitting electrodes 120a and 120b, and the power transmitting circuit 110 for supplying AC power to the power transmitting electrodes 120a and 120b. The power transmitting circuit 110 is an AC output circuit including an inverter circuit, for example. The power transmitting circuit 110 covers the DC power supplied from a DC power supply (not shown) into AC power, and outputs the AC power to the pair of power transmitting electrodes 120a and 120b. A matching circuit for reducing impedance mismatch may be inserted at a position preceding the power transmitting electrodes, to which the converted AC power is applied.

The transport robot 10 includes a power receiving device 200 and a load 330. The power receiving device 200 includes a pair of power receiving electrodes 220a and 220b, and a power receiving circuit 210 for converting the AC power received by the power receiving electrodes 220a and 220b into a type of electric power that is required by the load 330 and supplying the converted power to the load 330. The power receiving circuit 210 may include various circuits such as a rectifier circuit or a frequency conversion circuit, for example. A matching circuit for reducing impedance mismatch may be inserted at a position preceding the output of the power received by the power receiving electrode to a rectifier circuit.

The load 330 is a component that consumes or stores electric power, such as a motor, a capacitor for storing electricity or a secondary battery, for example. Electric power is wirelessly transferred between the pair of power transmitting electrodes 120a and 120b and the pair of power receiving electrodes 220a and 220b, while they oppose each other, via electric field coupling therebetween. The transferred power is supplied to the load 330.

The power transmitting electrodes may be arranged so as to cross the floor surface rather than parallel to the floor surface. For example, when installed on a wall, etc., the power transmitting electrodes may be arranged substantially vertical to the floor surface. The power receiving electrodes of the vehicle may also be arranged so electrodes oppose the power transmitting electrodes. Thus, the arrangement of the power receiving electrodes is determined according to the arrangement of the power transmitting electrodes.

With such a wireless power transmission system based on the electric field coupling method, the capacitance between the power transmitting electrode and the power receiving electrode opposing each other is typically small. Therefore, when transmitting a large amount of electric power, a high voltage is applied to the power transmitting electrodes 120a and 120b. In such a case, the intensity of the electric field that leaks around the power transmitting electrodes 120a and 120b and the power receiving electrodes 220a and 220b also becomes high.

Figure 3:
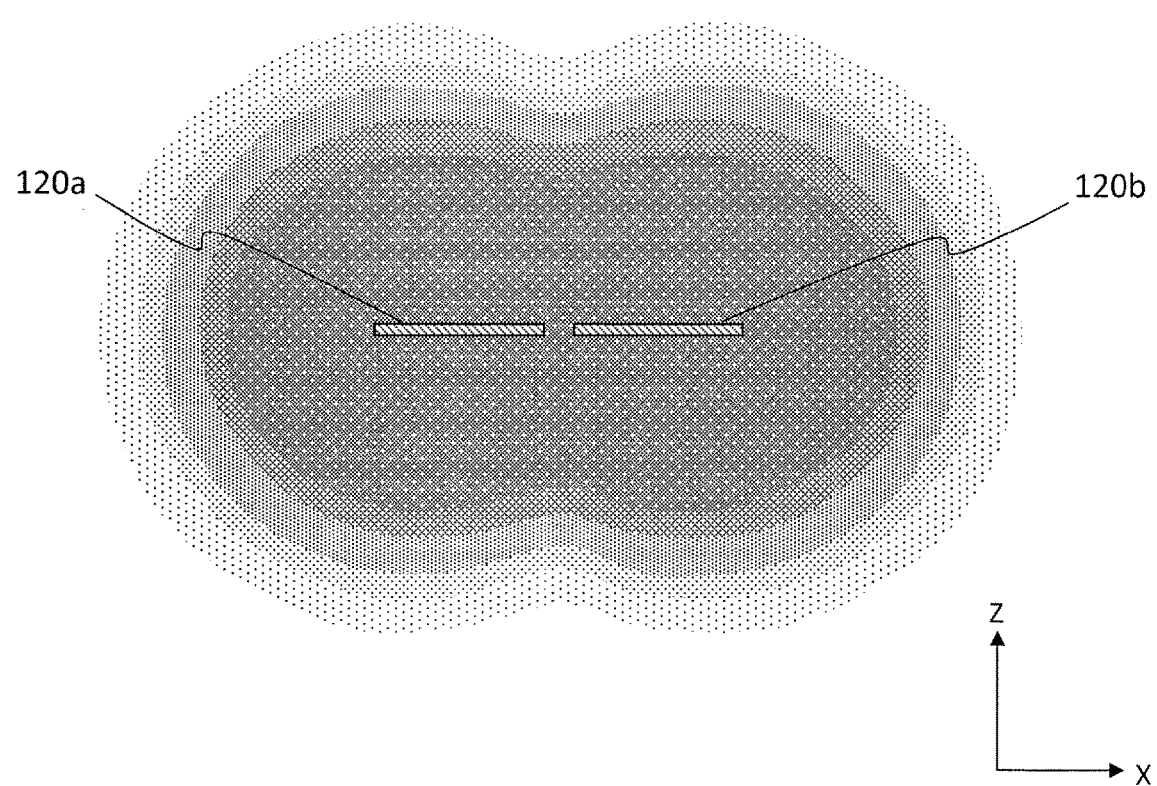
FIG. 3 shows an example of the distribution of an electric field formed around power transmitting electrodes 120a and 120b when transmitting power.

FIG. 3 shows an example of the distribution of an electric field formed around the power transmitting electrodes 120a and 120b when transmitting power. In FIG. 3, the darker the hatching, the higher the electric field intensity. In order to reduce the influence of electromagnetic noise, etc., on an electronic device, it is desirable to reduce the extent of the area of high electric field intensity that is present around each electrode. For example, the electric field intensity at a predetermined distance from each electrode is required not to exceed the immunity standard value determined for the electronic device. In view of biological safety, there may be a need to lower the leak electric field intensity aiming at the standard value determined by International Commission on Non-Ionizing Radiation Protection (ICNIRP).

Based on the above findings, the present inventor arrived at embodiments of the present disclosure to be described below.

An electrode unit according to an embodiment of the present disclosure is:

an electrode unit for use in a power transmitting device or a power receiving device of a wireless power transmission system based on an electric field coupling method, the electrode unit including:

a first electrode to which a first voltage is applied when power is transferred;

a second electrode to which a second voltage is applied when power is transferred, wherein the second voltage has a phase that is different from a phase of the first voltage by a value greater than 90 degrees and less than 270 degrees; and a third electrode spaced apart from the first and second electrodes, the third electrode having a third voltage whose amplitude is less than amplitudes of the first and second voltages when power is transferred, wherein:

the first and second electrodes are arranged along an electrode installation plane; and at least a portion of the third electrode does not overlap the first and second electrodes as viewed from a direction perpendicular to the electrode installation plane.

A plurality of first electrodes and a plurality of second electrodes are arranged along a plane. The plane is referred to as the "electrode installation plane". The electrode installation plane is not limited to a flat plane in a strict sense, but may be a curved surface. The electrodes do not need to be all coplanar, but it is only required that they be arranged along the electrode installation plane.

According to the aspect set forth above, the electrode unit includes a third electrode spaced apart from the first and second electrodes, the third electrode having a third voltage whose amplitude is less than amplitudes of the first and second voltages when power is transferred. At least a portion of the third electrode does not overlap the first and second electrodes as viewed from a direction perpendicular to the electrode installation plane.

With such a configuration, it is possible to reduce the leak electric field in the vicinity of (particularly, on the side of) at least one of the first and second electrodes. Then, it is possible to reduce the risk of causing other nearby devices to malfunction, for example.

When the third electrode is arranged in the vicinity of both of the first and second electrodes, it is possible to reduce the electric field intensity in the vicinity of both of the first and second electrodes. Therefore, it is possible to further reduce the risk described above.

The electrode unit set forth above may be installed on one or both of the power transmitting device and the power receiving device. If both of the power transmitting device and the power receiving device include the third electrode, it is possible to achieve particularly advantageous effects.

In an embodiment in which the electrode unit set forth above is installed in the power transmitting device, the first and second electrodes are connected to the power transmitting circuit for outputting AC power. The power transmitting circuit includes an inverter circuit, for example, and supplies AC power to the first and second electrodes. With the power transmitting circuit, the first voltage is applied to the first electrode and the second voltage antiphase to the first voltage is applied to the second electrode. Herein, "antiphase" means that the phase is different by a value greater than 90 degrees and less than 270 degrees. The amplitude of the second voltage is typically substantially equal to the amplitude of the first voltage.

On the other hand, in an embodiment in which the electrode unit is installed in the power receiving device, the first and second electrodes receive AC power from a pair of power transmitting electrodes of the power transmitting device that oppose the first and second, electrodes. In this case, the first voltage is applied to first electrode, and the second voltage antiphase to the first voltage is applied to the second electrode. Also in this case, the amplitude of the second voltage is typically substantially equal to the amplitude of the first voltage.

When an AC voltage is applied to the first and second electrodes, a potential fluctuation may occur also to the third electrode located in the vicinity of the first and second electrodes. The third electrode may be connected to an external potential. As a result of this, the third electrode has the third voltage. The potential fluctuation of the third electrode is weaker than the potential amplitude of the first and second electrodes. This as a result inhibits the sideway spread of the distribution of the electric field leakage from the first and second electrodes. Therefore, it is possible to particularly suppress the sideway electric field leakage.

To ensure that the third electrode has the third voltage when power is transferred, there are two possible configurations as follows. According to the first configuration, the third electrode is connected to a ground terminal provided in the housing or a circuit of the power transmitting device or the power receiving device. The supply of the third voltage to the third electrode is realized by the connection between the third electrode and the ground terminal. According to the second configuration, the third electrode includes a first portion, adjacent to the first electrode, a second portion adjacent to the second electrode, and a third portion that connects together the first portion and the second portion. With the second configuration, the supply of the third voltage to the third electrode is realized by an electromagnetic coupling between the first and second portions and the first electrode, and by an electromagnetic coupling between the second and third portions and the second electrode.

In one embodiment, as viewed from a direction perpendicular to the electrode installation plane, the area of a portion of the third electrode that does not overlap the first and second electrodes is greater than the area of a portion of the third electrode that overlaps the first and second electrodes. In another embodiment, as viewed from a direction perpendicular to the electrode installation plane, the third electrode does not entirely overlap the first and second electrodes. With such a configuration, it is possible to suppress unnecessary coupling which may occur when the third electrode is located between the first and second electrodes on the power transmitting side and the opposing first and second electrodes on the power receiving side. Thus, it is possible to effectively suppress the sideway electric field leakage of the first electrode or the second electrode while suppressing the transmission energy loss.

Herein, an electrode unit installed in the power transmitting device may be referred to as the "power transmitting electrode unit", and an electrode unit installed in the power receiving device may be referred to as the "power receiving electrode unit", when the electrode unit is installed in the power transmitting device, the first electrode and the second electrode are referred to as power transmitting electrodes. When the electrode unit is installed in the power receiving device, the first electrode and the second electrode are referred to as power receiving electrodes. When power is transferred, a pair of power transmitting electrodes oppose a pair of power receiving electrodes. Electric power is transmitted from the pair of power transmitting electrodes to the pair of power receiving electrodes via electric field coupling therebetween.

In each of the power transmitting electrode unit and the power receiving electrode unit, one of the first electrode and the second electrode may be divided into two portions that extend in parallel to each other. In such a case, the other one of the first electrode and the second electrode is arranged between the two portions. Voltages of the same phase are applied to the two portions. With such a configuration, it is possible to also realize the effect of suppressing the leak electric field over the boundary between the first electrode and the second electrode. In an example, the other one of the first and second electrodes extends in the same direction as the two portions. The width of the two portions may be set to a value that is close to half the width of the second electrode, for example. For example, the width of the two portions may be set to be 0.4 times or more and 0.6 times or less the width of the second electrode. Thus, with a configuration in which one of the first and second electrodes is divided into two portions, there are essentially three electrodes that contribute to power transfer. When referring to such a configuration, the three electrodes may be referred to as "a set of electrodes".

The electrode unit may include a sheet-shaped structure. The first to third electrodes may be inside the sheet-shaped structure. In one embodiment, a conductor pattern formed on the substrate included in the sheet-shaped structure may be used as the first to third, electrodes. The sheet-shaped structure may be a layered structure including a plurality of layers, for example. In one example, at least two of the first to third electrodes are located in different ones of the plurality of layers. Such a configuration can be easily employed when a shield made of a conductor for suppressing the leak electric field is arranged in addition to the first to third electrodes, for example. Such a shield may be arranged so that the gap between the first electrode and the second electrode is covered between the power transmitting device and the power receiving device, for example. In such a case, the shield is arranged in a layer that is different from the first and second electrodes. The third electrode may also be arranged in the same layer as the shield, for example. The first and second electrodes may be arranged in different layers.

A power transmitting device according to an embodiment, of the present disclosure includes an electrode unit set forth above, and a power transmitting circuit for supplying AC power to the first and second electrodes of the electrode unit.

A power receiving device according to another embodiment of the present disclosure includes an electrode unit set forth above, and a power receiving circuit for converting AC power received by the first and second electrodes of the electrode unit into DC power or a different, type of AC power and supplying the converted power to a load.

A wireless power transmission system according to still another embodiment of the present disclosure includes a power transmitting device including a power transmitting electrode unit, and a power receiving device including a power receiving electrode unit. At least one of the power transmitting electrode unit and the power receiving electrode unit has an equivalent configuration to that of the electrode unit set forth above.

The power receiving device may be installed on a vehicle, for example. The "vehicle" as used herein is not limited to a vehicle such as a transport robot set forth, above, but refers to any movable object that is driven by electric power. The vehicle includes a powered vehicle that included an electric motor and one or more wheels, for example. Such a vehicle can be an automated guided vehicle (AGV) such as a transport robot set forth above, and electric vehicle (EV), an electric cart, or an electric wheelchair, for example. The "vehicle" as used herein also includes a movable object that does not include wheels. For example, the "vehicle" includes biped walking robots, unmanned aerial vehicles (UAVs, so-called "drones") such as multicopters, manned electric aircrafts, and elevators.

An electronic device according to another embodiment of the present disclosure is installed on a vehicle including a power receiving device set forth above. The power receiving device receives electric power that is wirelessly transmitted from the power transmitting device, and supplies the electric power to a load. The electronic device includes a sensing device. The sensing device obtains information from a sensing target around the vehicle by using electromagnetic field or ultrasonic waves. The electronic device may further include a shielding member. The shielding member shields the leak electromagnetic field that occurs when power is transferred from, the power transmitting device to the power receiving device without hindering the transfer of the electromagnetic field or ultrasonic waves from the sensing target to the sensing device.

The "sensing device" may be any electronic device such as an imaging device, a human detection sensor, an obstruction detection sensor, an RFID reader, a wireless communication device, an ultrasonic sensor, or a temperature sensor, for example. The sensing device is capable of obtaining information from sensing targets around the vehicle by using electromagnetic waves such as ultraviolet rays, visible light, infrared rays, terahertz waves or microwaves, or by using electromagnetic induction. That is, the sensing device is capable of sensing the ambient environment by using an electromagnetic field. Other than using an electromagnetic field, the sensing device may sense the environment around the vehicle by using any other physical variations such as ultrasonic waves.

The "sensing target" (hereinafter referred to also as an "object") may be a mark including the one-dimensional or two-dimensional code described above, for example. The sensing device may be an imaging device including a one-dimensional or two-dimensional array of photoelectric conversion devices, or a barcode reader. These sensors are capable of obtaining information recorded in the code by capturing the image of the mark. The code may include location information, for example. In such a case, the sensing device can obtain the location information of the code by reading the code. Thus, it is possible to recognize the location of the vehicle.

The "sensing target" may be a human or any other obstruction (e.g., an animal, another vehicle, or an article temporarily placed there). In such a case, the sensing device may be a sensor such as a RADAR, a LIDAR, an infrared sensor, an imaging device or an ultrasonic sensor, for example. These sensors are capable of detecting the presence of a human or any other obstruction therearound by using electromagnetic waves or ultrasonic waves. The vehicle can perform various operations based on the output of the sensor. For example, when it is detected that there is a human or an article in the vicinity of the power transmitting electrodes, to reduce or stop the power transfer.

Note that the electromagnetic field or ultrasonic waves propagating from a sensing target to the sensing device may slightly attenuate when passing through the shielding member. As used herein, the shielding member allowing the majority of the energy of the electromagnetic field or ultrasonic waves to pass therethrough means that "the propagation of the electromagnetic field, or ultrasonic waves is not hindered". The function in the present disclosure can be realized when the degree of attenuation of the energy of the electromagnetic field or ultrasonic waves to be sensed is less than the degree of suppression of the electromagnetic component energy of the noise frequency band to be shielded.

The shielding member may completely surround the sensing device, or may partially surround the sensing device if there is little influence of electromagnetic noise. The material of the shielding member may be appropriately selected based on the frequency to be used for transmitting power and on the mode of sensing.

When the sensing device obtains information from sensing targets by using light, the shielding member may include a transparent conductive member. The transparent conductive member may be arranged on the path of light entering the sensing device from sensing targets. The transparent conductive member allows light to pass therethrough, but shields the electromagnetic field having a relatively low frequency that is caused by power transfer. Thus, it is possible to relax the influence on the sensing device from the electromagnetic field around each electrode, without affecting the sensing. The shielding member may surround the sensing device with the transparent conductive member and a non-transparent common conductive member.

The term "light", as used herein, is not limited to visible light (electromagnetic waves whose wavelength is about 400 nm to about 700 nm), but includes ultraviolet rays (electromagnetic waves whose wavelength is about 10 nm to about 400 nm) and infrared rays (electromagnetic waves whose wavelength is about 700 nm to about 2500 nm). Ultraviolet rays may be referred to as "light in the ultraviolet range" or "ultraviolet light", visible light may be referred to as "light in the visible range", and infrared rays may be referred to as "light in the infrared range" or "infrared light".

In an embodiment in which the sensing device obtains information from sensing targets by using electromagnetic waves, the shielding member may include a shield having at least one opening therein. Such a shield may be arranged on the path of propagation of electromagnetic waves from sensing targets to the sensing device. At least the surface of the shield is conductive. The shield may be grounded. In such an embodiment, the sensing device obtains information from sensing targets by using electromagnetic waves of a band whose lowest frequency fm is higher than the frequency f1 of electric power to be transferred from the power transmitting device to the power receiving device. The diameter of each opening in the shield is set to a value that is greater than half the wavelength of the electromagnetic waves used for sensing and that is less than half the wavelength of the electromagnetic waves of the frequency used for transmitting electric power. In other words, the diameter of each opening in the shield may be set to a value that is greater than c/(2fm) and less than c/(2f1), where c is the speed of light in vacuum. Then, the shield can shield electromagnetic waves of relatively low frequencies caused by power transfer while allowing to pass therethrough electromagnetic waves of relatively high frequencies used for sensing.

A sensing target may be arranged between two power transmitting electrodes adjacent to each other, for example. A sensing target may be a communication device, such as a mark including a one-dimensional or two-dimensional code or an RF tag arranged between two power transmitting electrodes. In such a case, the shielding member may include a shield having a transparent conductive member described above or at least one opening on the path of electromagnetic waves such as light or radio waves extending from the mark or the communication device to the sensing device.

A sensing target may be located on any of the power transmitting electrodes. In such a case, a portion of a power receiving electrode that overlaps the sensing target with the plurality of power transmitting electrodes and the plurality of power receiving electrodes opposing each other may be made of a light transmissive material. The sensing device can obtain information by detecting light from the sensing target that has passed through the light transmissive portion of the power receiving electrode.

Embodiments of the present disclosure will now be described in greater detail. Note however that unnecessarily detailed descriptions may be omitted. For example, detailed descriptions on what are well known in the art and redundant descriptions on substantially the same configurations may be omitted. This is to prevent, the following description from becoming unnecessarily redundant, to make it easier for a person of ordinary skill in the art to understand. Note that the present inventor provide the accompanying drawings and the following description in order for a person of ordinary skill in the art to sufficiently understand the present disclosure, and they are not intended to limit the subject matter set forth in the claims. In the following description, elements having the same function or similar functions are denoted by the same reference signs.

Embodiment 1

Figure 4:
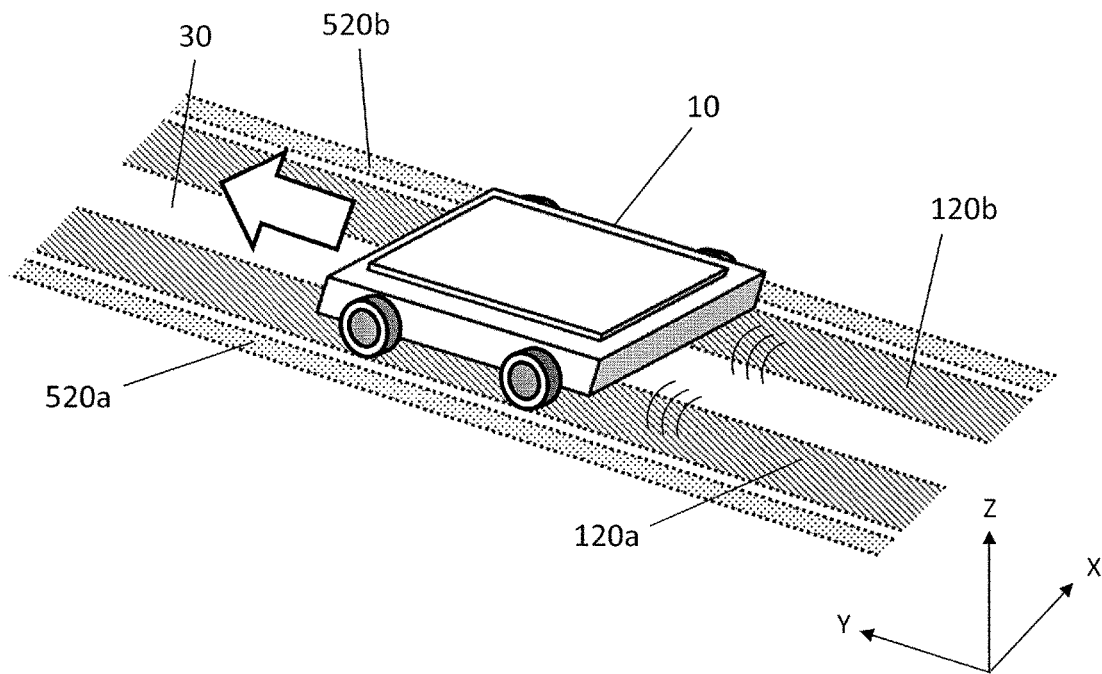
FIG. 4 is a diagram schematically showing a wireless power transmission system according to Embodiment 1 of the present disclosure.

FIG. 4 is a diagram schematically showing a wireless power transmission system according to Embodiment 1 of the present disclosure. In the system shown in FIG. 4, as in the system shown in FIG. 1, electric power is wirelessly transmitted from a power transmitting device including a pair of power transmitting electrodes arranged on or under the floor surface to the transport robot 10 including a pair of power receiving electrodes. The pair of power transmitting electrodes are a first power transmitting electrode 120a and a second power transmitting electrode 120b. The second power transmitting electrode 120b is spaced apart from the first power transmitting electrode 120a in the first direction (the X direction in this example) that extends along the surface of the first power transmitting electrode 120a.

The power transmitting electrodes 120a and 120b extend parallel to each other along the floor surface. The power transmitting electrodes 120a and 120b are arranged substantially coplanar with each other. The transport robot 10 can move along the power transmitting electrodes 120a and 120b while receiving electric power therefrom.

In the present embodiment, as opposed to the configuration shown in FIG. 1, a third electrode is arranged with an interval from the first electrode 120a and the second electrode 120b. The third electrode includes a first portion 520a adjacent to the first electrode 120a, and a second portion 520b adjacent to the second electrode 120b. In the following description, each of the first portion 520a and the second portion 520b of the third electrode may be referred to as a "third electrode 520".

The first portion 520a and the second portion 520b of the third electrode extend in the same direction as the power transmitting electrodes 120a and 120b. The width (the dimension in the X direction) of each of the first portion 520a and the second portion 520b is less than the width of each of the power transmitting electrodes 120a and 120b. The width of the first portion 520a and the second portion 520b may be small, e.g., less than 12% of the width of each of the power transmitting electrodes 120a and 120b. As viewed from transmitting electrodes 120a and 120b, the area of each of the first portion 520a and the second portion 520b is less than the area of each of the power transmitting electrodes 120a and 120b. The area of each of the first portion 520a and the second portion 520b may be small, e.g., less than 12% of the area of each of the power transmitting electrodes 120a and 120b. Note that the width or area of each portion of the third electrode may be greater than that of each of the first electrode 120a and the second electrode 120b.

Figure 5:
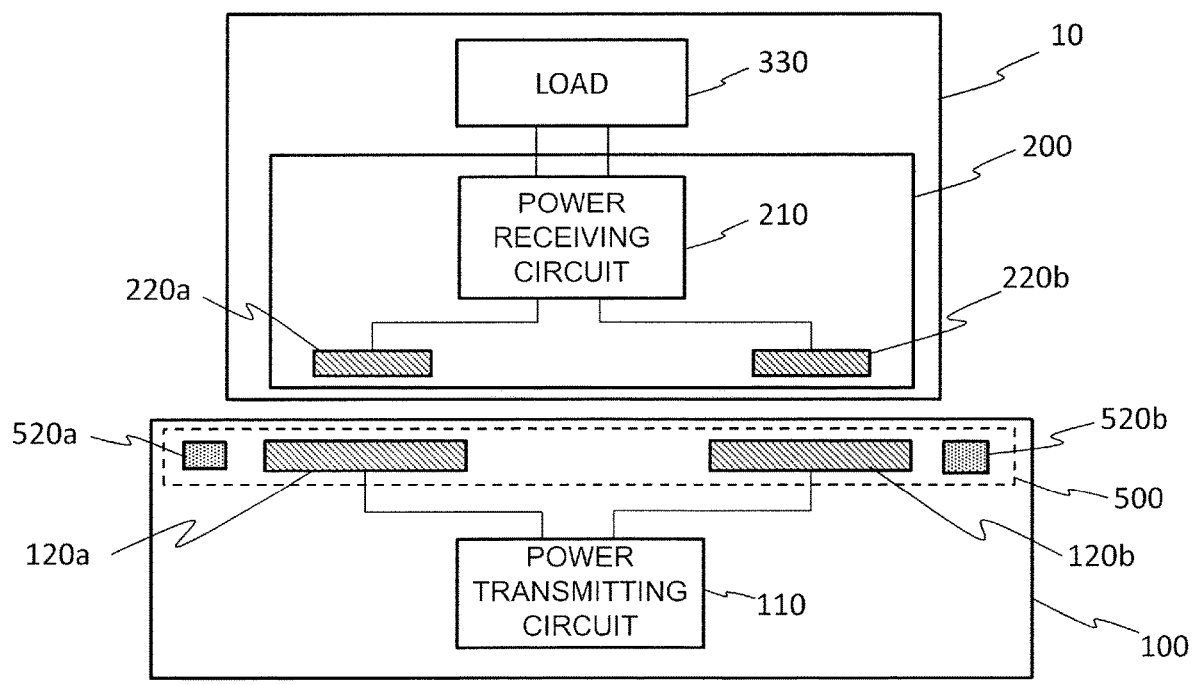
FIG. 5 is a diagram showing a general configuration of the wireless power transmission system shown in FIG. 4.

FIG. 5 is a diagram showing a general configuration of a wireless power transmission system, shown in FIG. 4. FIG. 5 is similar to the configuration shown in FIG. 2 except for the addition of the first portion 520a and the second portion 520b of the third electrode.

The power transmitting device 100 of the present embodiment includes an electrode unit 500 and the power transmitting circuit 110. The electrode unit 500 includes the pair of power transmitting electrodes 120a and 120b and the third electrode (including the first portion 520a and the second portion 520b). The power transmitting circuit 110 supplies AC power to the power transmitting electrodes 120a and 120b. The power transmitting circuit 110 is an AC output circuit including an inverter circuit, for example. The power transmitting circuit 110 covers the DC power supplied from a DC power supply (not shown) into AC power, and outputs the AC power to the pair of power transmitting electrodes 120a and 120b. The transport robot 10 has the same configuration as the transport robot 10 shown in FIG. 2.

With such a configuration, the transport robot 10 can wirelessly receive electric power while moving along the power transmitting electrodes 120a and 120b. The transport robot 10 moves in the direction in which the power transmitting electrodes 120a and 120b extend (the Y direction in FIG. 1) while keeping the power transmitting electrodes 120a and 120b and the power receiving electrodes 220a and 220b adjacent to and opposing each other. Thus, the transport robot 10 can move while charging a condenser such as a capacitor, for example.

When power is transferred, a first voltage is applied to the first power transmitting electrode 120a, and a second voltage antiphase to the first voltage is applied to the second power transmitting electrode 120b. Herein, antiphase means that the phase difference is greater than 90 degrees and less than 270 degrees. Typically, the phase of the second voltage is 180 degrees different from the phase of the first voltage. Note however that electric power can be transmitted even when the phase difference is shifted from 180 degrees. The amplitude of the second voltage is substantially equal to the amplitude of the first voltage. Strictly speaking, the first and second voltages does not only include the component of the transmission frequency, but may also include components of other frequencies. In this satisfied for the component of the transmission frequency. The term "transmission frequency", as used herein, means the switching frequency of the inverter circuit connected to the power transmitting electrodes 120a and 120b.

When power is transferred, the first portion 520a of the third electrode has a voltage of a lower amplitude than the first voltage. On the other hand, when power is transferred, the second portion 520b of the third electrode has a voltage of a lower amplitude than the second voltage. That is, the amplitudes of the voltages of the first portion 520a and the second portion 520b of the third electrode are both less than the amplitude of the first and second voltages. The term "voltage", as used herein, means the potential with respect to the reference potential. The reference potential is typically the ground potential.

There are generally two methods by which the first portion 520a and the second portion 520b of the third electrode have such a voltage described above when power is transferred. The first method is to ground the first portion 520a and the second portion 520b. The second method is to connect the first portion 520a and the second portion 520b together.

Figure 6:
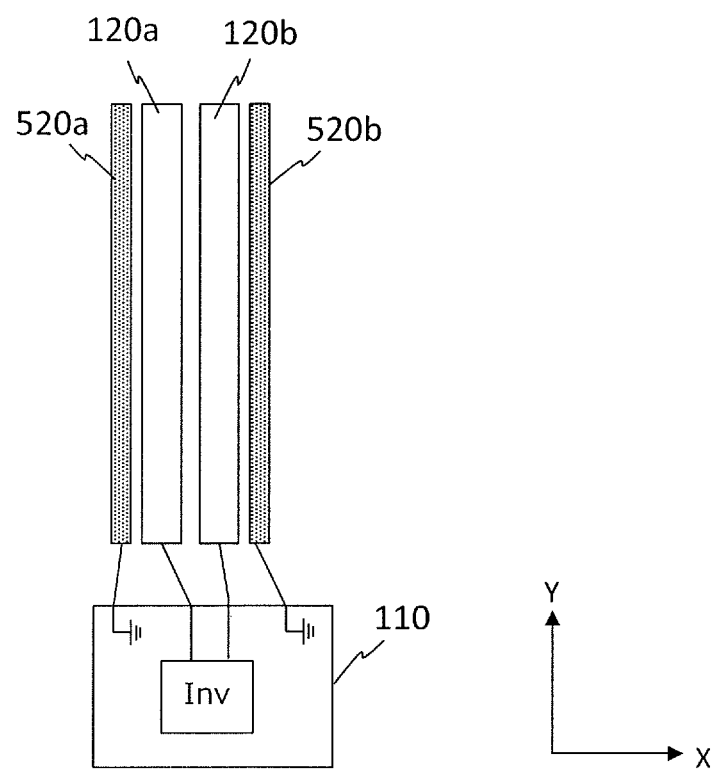
FIG. 6 is a diagram schematically showing a configuration in which a first portion 520a and a second portion 520b of a third electrode are grounded.

FIG. 6 is a diagram schematically showing an example of a configuration in which the first portion 520a and the second portion 520b of the third electrode are grounded. In this example, the first portion 520a and the second portion 520b of the third electrode are each connected to a ground terminal of the power transmitting circuit 110. When power is transferred, an AC voltage is applied from the inverter circuit Inv of the power transmitting circuit 110 to the power transmitting electrodes 120a and 120b. On the other hand, the potential of the first portion 520a and the second portion 520b of the third electrode is fixed at a third voltage. As a result, the intensity of the leak electric field on the side of the power transmitting electrodes 120a and 120b is reduced.

In this example, the third electrode only includes the first portion 520a and the second portion 520b. The first power transmitting electrode 120a, the second power transmitting electrode 120b, and the first portion 520a and the second portion 520b of the third electrode each have a structure extending in the same direction. For the third electrode, the length from one end of each of the first portion 520a and the second portion 520b, which is connected to the ground terminal, to the other end thereof may be set to be less than ¼ the wavelength corresponding to the frequency of the electric power transmitted, for example. This is to prevent the third electrode from functioning as an antenna and giving unnecessary radiation.

Figure 7A:
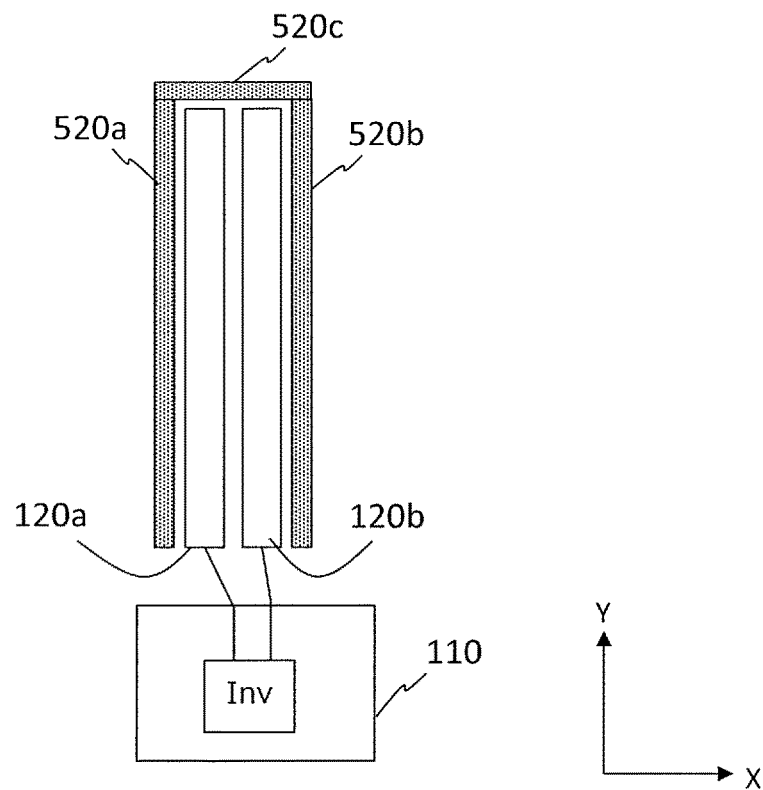
FIG. 7A is a diagram schematically showing an example of a configuration in which the first portion 520a and the second portion 520b are connected to each other.
Figure 7B:
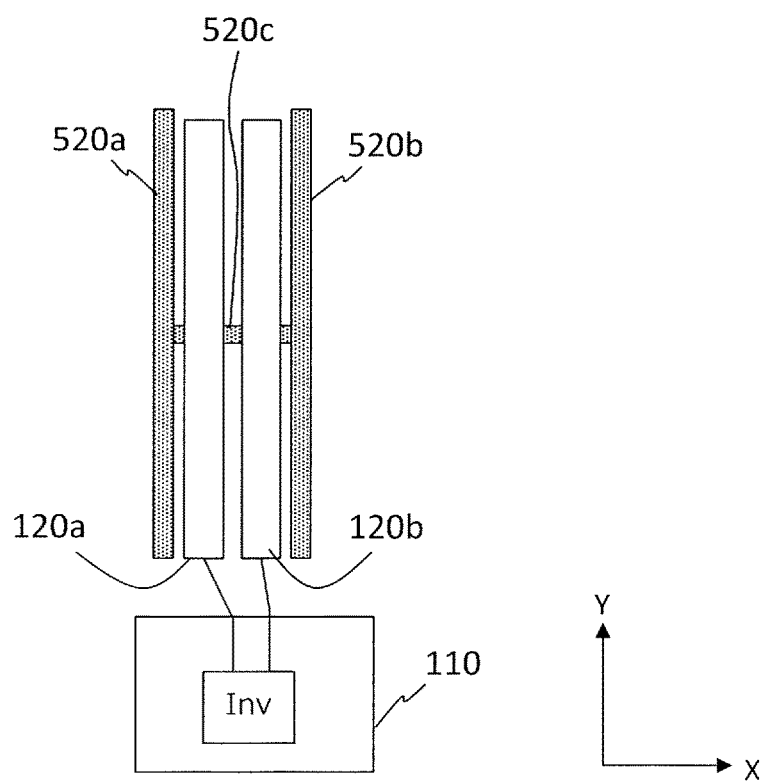
FIG. 7B is a diagram schematically showing another example of a configuration in which the first portion 520a and the second portion 520b are connected to each other.

FIG. 7A and FIG. 7B are diagrams schematically showing an example of a configuration in which the first portion 520a and the second portion 520b are connected to each other. In these examples, the third electrode further includes a third portion 520c that connects together the first portion 520a and the second portion 520b. The supply of the third voltage to the third electrode is realized by an electromagnetic coupling between the first and third portions 520a and 520c and the first power transmitting electrode 120a, and by an electromagnetic coupling between the second and third portions 520b and 520c and the second electrode 120b.

In the example of FIG. 7A, the first portion 520a and the second portion 520b extend in the same direction as the power transmitting electrodes 120a and 120b. In the example of FIG. 7A, the length of the first portion 520a and the second portion 520b is set to be slightly longer than the length of the power transmitting electrodes 120a and 120b. This is to connect together one end of the first portion 520a and one end of the second portion 520b by the third portion 520c. In another example that is not shown in the figures, the arrangement of the first portion 520a and the second portion 520b may be limited to an area or areas where there is a need to suppress the electric field leakage in the X direction. In such a case, the length of the first portion 520a and the second portion 520b may be set to be shorter than the power transmitting electrodes 120a and 120b. The power transmitting electrodes 120a and 120b are located inside the area that is defined by the first portion 520a, the second portion 520b and the third portion 520c as viewed from the direction perpendicular to the XY plane. Herein, the area that is defined by the first portion 520a, the second portion 520b and the third portion 520c refers to the area that is surrounded by these portions.

In the example of FIG. 7B, on the back side of the first power transmitting electrode 120a and the second power transmitting electrode 120b, the third portion 520c connects together a portion of the first portion 520a other than the opposite ends thereof and a portion of the second portion 520b other than the opposite ends thereof. The term "back side" means the side opposite from the side on which the power receiving electrodes 220a and 220b are located when power is transferred. The third portion 520c may connect together a central portion of the first portion 520a and a central portion of the second portion 520b, as shown in the figure, or may connect together other portions. A plurality of third portions 520c may connect together the first portion 520a and the second portion 520b.

With the configuration shown in FIG. 7A and FIG. 7B, when an AC voltage is applied to the power transmitting electrodes 120a and 120b, a capacitive coupling occurs between the portions of the third electrode and the power transmitting electrodes 120a and 120b. Specifically, a portion of the third portion 520c that is close to the first power transmitting electrode 120a and the first portion 520a are coupled with the first power transmitting electrode 120a. On the other hand, a portion of the third portion 520c that is close to the second power transmitting electrode 120b and the second portion 520b are coupled with the second power transmitting electrode 120b. Since the third electrodes 520 are forcibly electrically connected together via the third portion 520c, the potential thereof is forcibly fixed. As a result, the advantageous effect of the third electrode having the low-amplitude third potential is exerted around the power transmit ting electrodes 120a and 120b. That is, the intensity of the leak electric field decreases rapidly in the X-axis direction.

With the configurations shown in FIG. 7A and FIG. 7B, the third electrode is designed so that the coupling capacity between the first power transmitting electrode 120a and the third electrode is close to the coupling capacity between the second power transmitting electrode 120b and the third electrode. For example, the third electrode may be designed so that these two coupling capacities coincide with each other. With such configurations, it is possible to effectively suppress the leak electric field.

The present inventor conducted an electromagnetic field analysis both for the configuration of the present embodiment and for the configuration of a reference example in which the third electrode is absent to test the advantageous effects of the present embodiment. The analysis result will now be described with reference to FIG. 8 to FIG. 10B.

Figure 8:
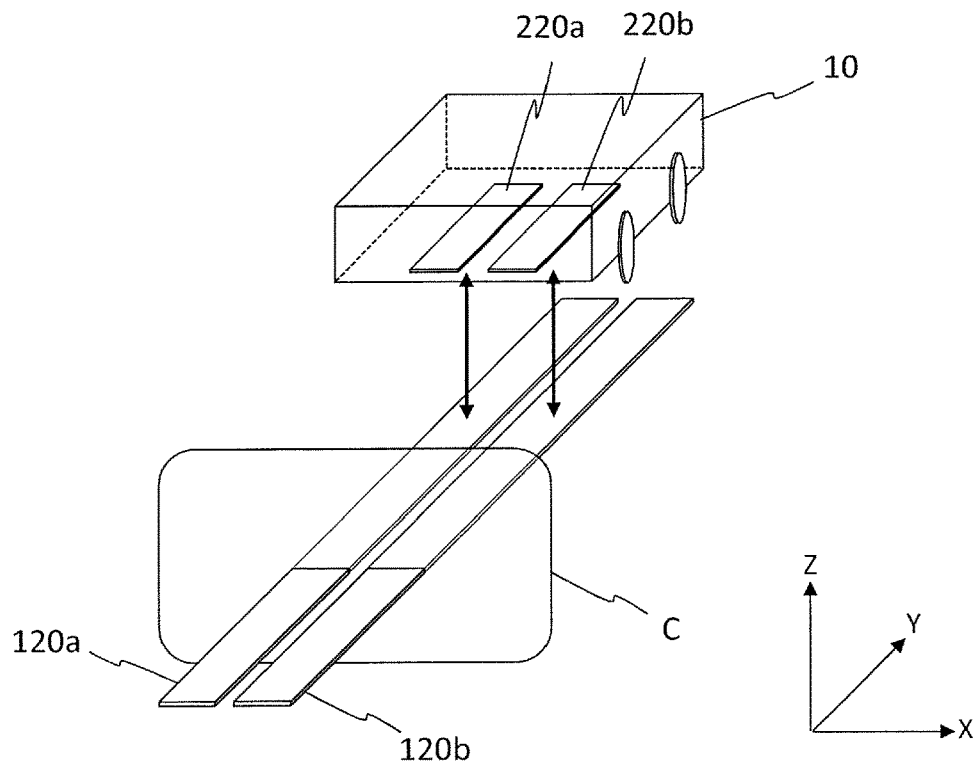
FIG. 8 is a diagram schematically showing a configuration of a reference example.
Figure 9:
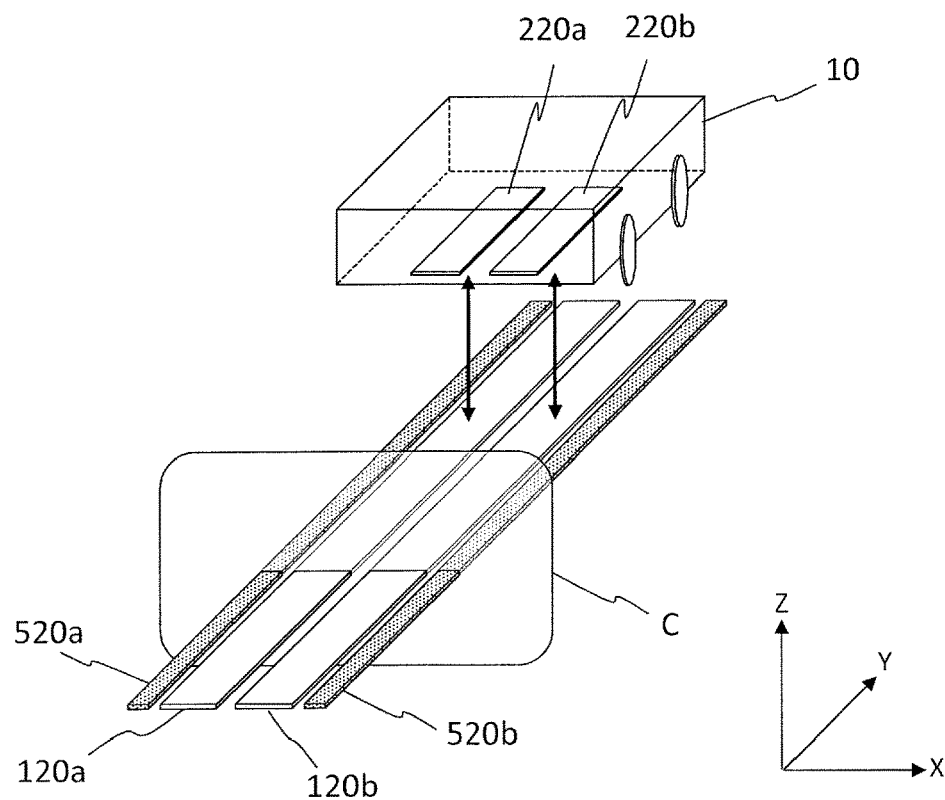
FIG. 9 is a diagram schematically showing a configuration of an embodiment of the present disclosure.

FIG. 8 is a diagram schematically showing a configuration of a reference example. In the reference example, the third electrode is absent as with the conventional wireless power transmission system based on the electric field coupling method. FIG. 9 is a diagram schematically showing the configuration of the present embodiment. In the embodiment, the third electrodes (the first portion 520*a* and the second portion 520*b*) are arranged on opposite sides of the pair of power transmitting electrodes 120*a* and 120*b*. The third electrodes are grounded. In the examples shown in FIG. 8 and FIG. 9, AC power was input to the power transmitting electrodes 120*a* and 120*b*, and the distribution of electric field intensity along the section C was calculated.

The following parameters were used in the analysis.

Width of power transmitting electrodes 120*a* and 120*b*; w1=150 mm

Gap between power transmitting electrodes 120*a* and 120*b*: g1=25 mm

Input power P=1 kW

Width of portions 520*a* and 520*b* of third electrode: w2=18 mm

Gap between power transmitting electrodes 120*a* and 120*b* and third electrode: g2=2 mm In the reference example of FIG. 8, the power transmitting electrodes 120*a* and 120*b* were inside a sheet-shaped structure made of an ABS region. In the embodiment of FIG. 9, the power transmitting electrodes 120*a* and 120*b* and the portions 520*a* and 520*b* of the third electrode were inside a sheet-shaped structure made of the same ABS region. The width (the dimension in the X direction) of the sheet-shaped structure was 400 mm.

Figure 10A:
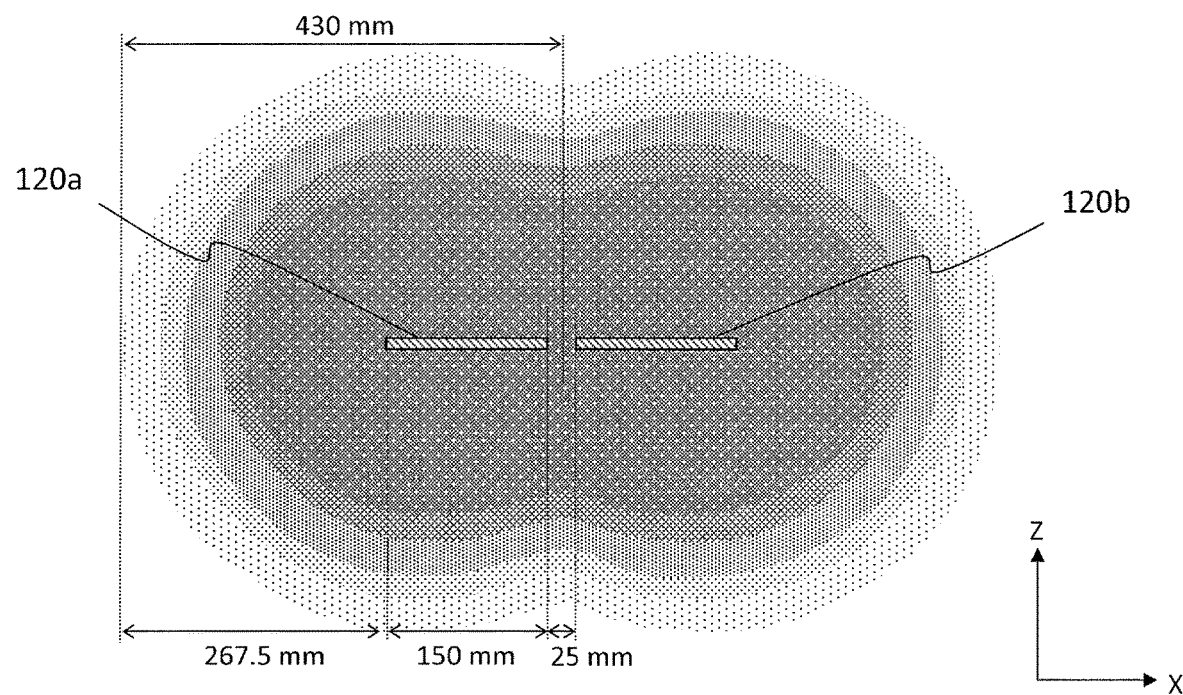
FIG. 10A shows an electric field distribution for the reference example shown in FIG. 8.
Figure 10B:
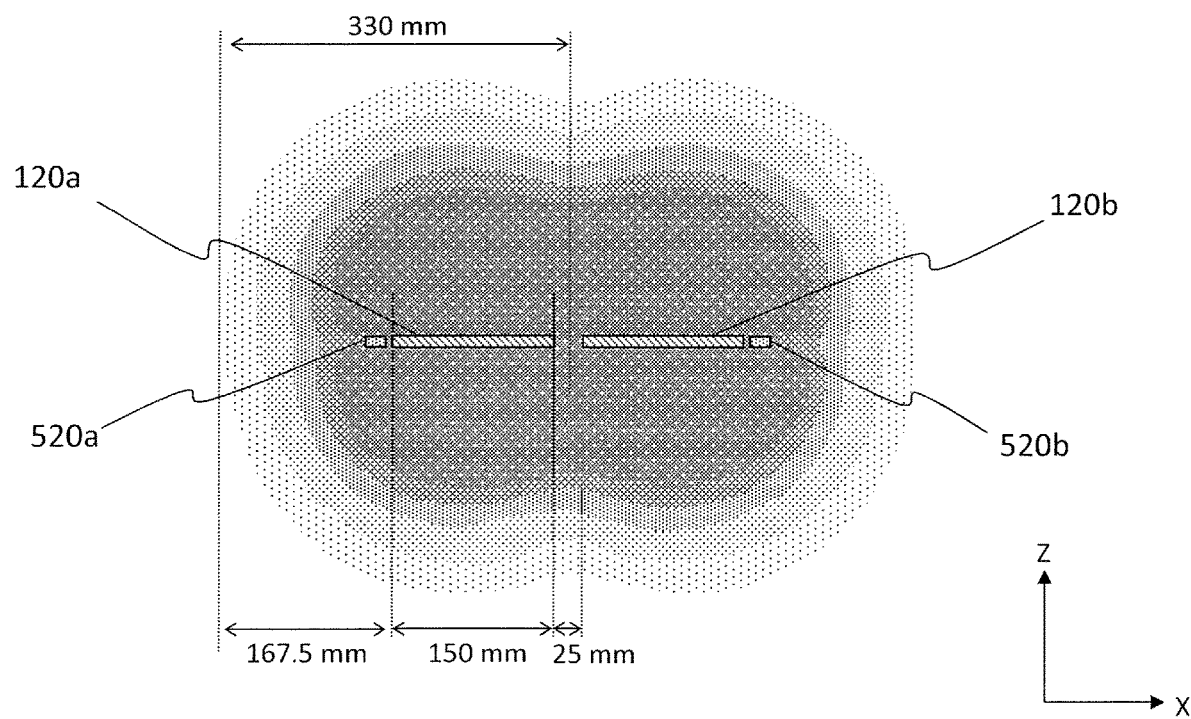
FIG. 10B shows an electric field distribution for the embodiment shown in FIG. 9.

FIG. 10A and FIG. 10B show the analysis results. FIG. 10A shows the electric field distribution according to the reference example shown in FIG. 8. FIG. 10B shows the electric field distribution according to the embodiment shown in FIG. 9. In these figures, hatching represents areas where the electric field intensity exceeds the standard value defined by ICNIRP. The darker the hatching, the higher the electric field intensity. As can be seen from FIGS. 10A and 10B, with the configuration of the embodiment, the leak electric field is reduced on opposite sides of the power transmitting electrodes 120*a* and 120*b*. In the present analysis, the distance from the end portion of the power transmitting electrode 120*a* to a position at which the electric field intensity becomes less than or equal to the standard value was shrunk by about 37% from 267.5 mm to 167.5 mm. Thus, it was confirmed that the provision of the third electrode significantly decreases the intensity of the leak electric field.

The present inventor conducted similar analyses for other examples while varying parameters such as the width of the third electrode and the gap between the third electrode similar advantageous effects are realized with any example. It was confirmed, that a sufficient effect can be realized even when the width of the third electrode is small. For example, in the embodiment, described above, even when w2 was lowered from 18 mm to 0.5 mm, the distance from the end portion of the power transmitting electrode 120*a* to the position at which the electric field intensity becomes less than or equal to the standard value increased only by 1.4 cm, confirming that advantageous effects of the present application are realized.

As described above, according to the present embodiment, the third electrode is arranged on opposite sides of the power transmitting electrodes 120*a* and 120*b*. Thus, the leak electric field is suppressed in areas on opposite sides of the power transmitting electrodes 120*a* and 120*b*.

While the third electrode is provided in the vicinity of opposite sides of the power transmitting electrodes 120*a* and 120*b* in the present embodiment, the third electrode may be provided in the vicinity of only one of the power transmitting electrodes 120*a* and 120*b*. With such a configuration, it is possible to suppress the leak electric field around one of the power transmitting electrodes 120*a* and 120*b*.

The third electrode may be arranged in the vicinity of at least one of the power receiving electrodes 220*a* and 220*b* of the power receiving device 200. Even with such a configuration, it is possible to suppress the leak electric field when power is transferred.

Various modifications can be made to the size, shape and position of the third electrode. Some variations will now be described.

Figure 11A:
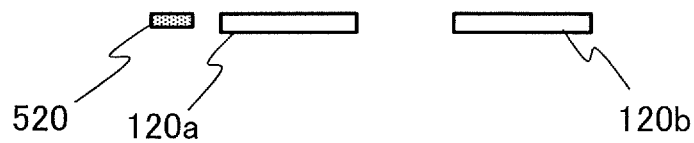
FIG. 11A is a diagram showing an example in which a third electrode 520 is coplanar with the power transmitting electrodes 120a and 120b.
Figure 11B:
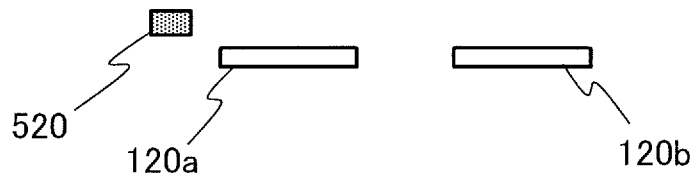
FIG. 11B is a diagram showing an example in which the third electrode 520 is not coplanar with either one of the power transmitting electrodes 120a and 120b.
Figure 11C:
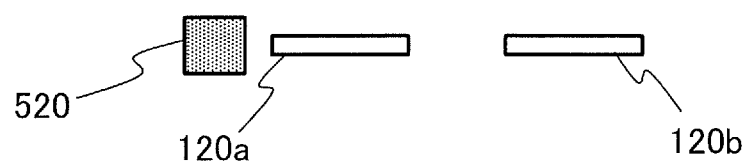
FIG. 11C is a diagram showing an example in which the thickness of the third electrode 520 is greater than the thickness of the electrodes 120a and 120b.
Figure 11D:
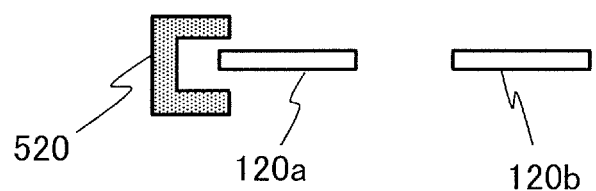
FIG. 11D is a diagram showing an example in which the third electrode 520 is larger, and a portion of the third electrode 520 overlaps the power transmitting electrode 120a as viewed from a direction perpendicular to the surface of the power transmitting electrodes 120a and 120b.

FIG. 11A to FIG. 11D show an example in which the third electrode 520 is provided, in the vicinity of only the first power transmitting electrode 120*a*. FIG. 11A shows an example in which the third electrode 520 is coplanar with the power transmitting electrodes 120*a* and 120*b*. FIG. 11B shows an example in which the third electrode 520 is not coplanar with either one the power transmitting electrodes 120*a* and 120*b*. FIG. 11C shows an example in which the thickness of the third electrode 520 is greater than the thickness of the electrodes 120*a* and 120*b*. FIG. 11D shows an example in which the third electrode 520 is relatively large, and a portion of the third electrode 520 overlaps the power transmitting electrode 120*a* as viewed from a direction perpendicular to the surface of the power transmitting electrodes 120*a* and 120*b*.

As shown in these examples, the third electrode 520 may have various structures. These variations can similarly be applied to a case in which the third electrode 520 is arranged in the vicinity of the second power transmitting electrode 120*b* and a case in which the third electrode 520 is arranged in the vicinity of the power receiving electrodes 220*a* and 220*b*.

Figure 12A:
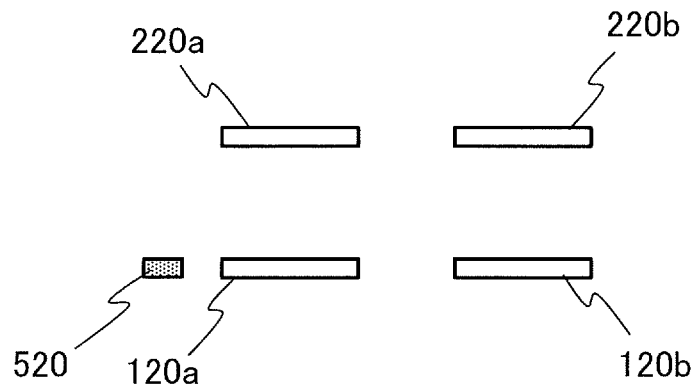
Figure 12B:
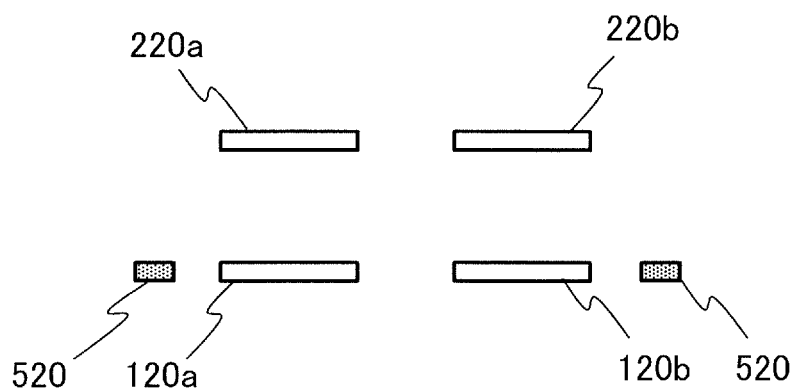
FIG. 12B is a diagram showing an example in which the third electrode 520 is arranged in the vicinity of both of the pair of power transmitting electrodes 120a and 120b.
Figure 12C:
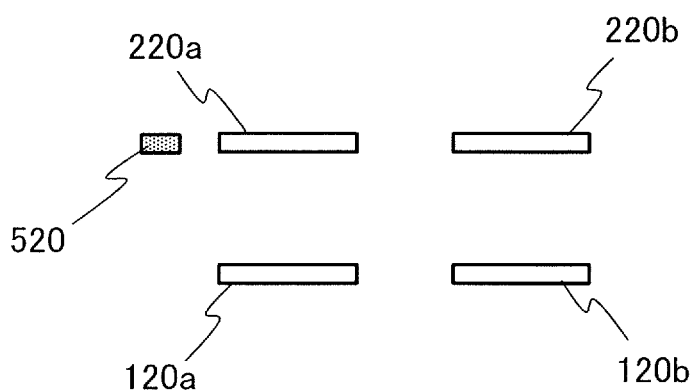
Figure 12D:
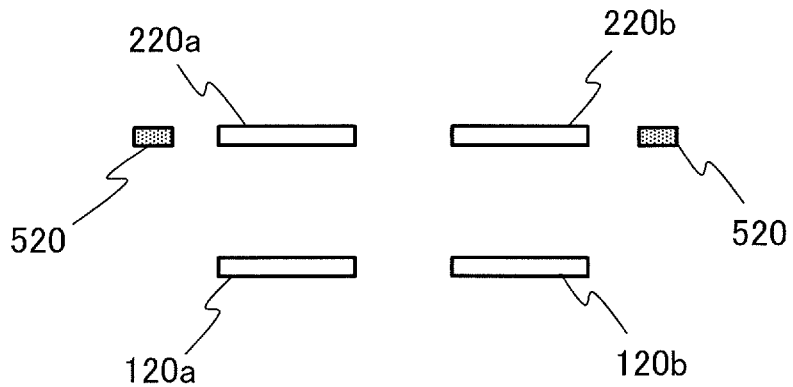
FIG. 12D is a diagram showing an example in which the third electrode 520 is arranged in the vicinity of both of the pair of power receiving electrodes 220a and 220b.
Figure 12E:
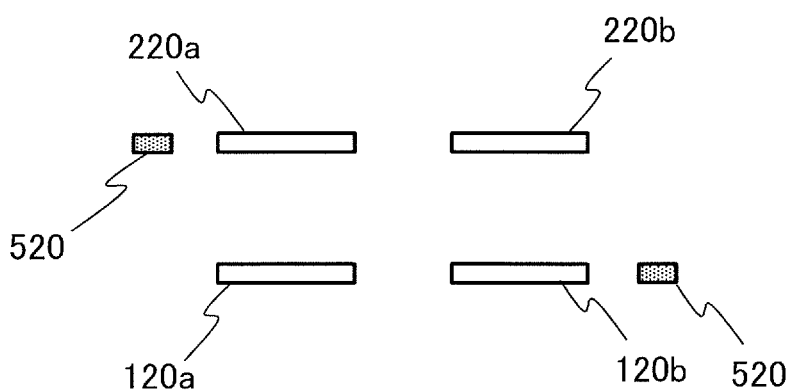
Figure 12F:
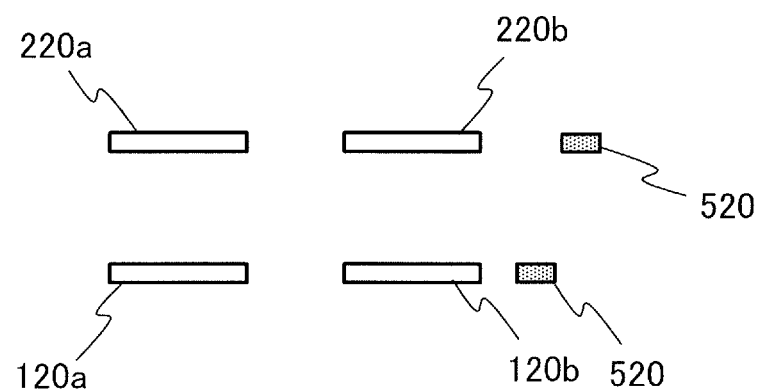
FIG. 12F is a diagram showing an example in which the third electrode 520 is arranged in the vicinity of one power transmitting electrode 120b and in the vicinity of one power receiving electrode 220b.
Figure 12G:
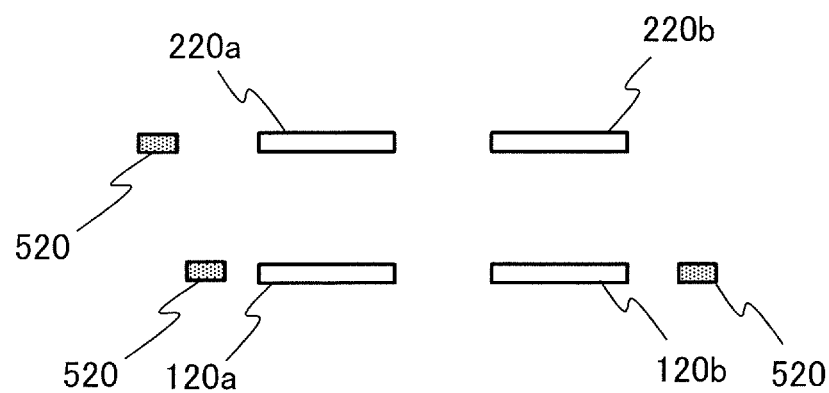
Figure 12H:
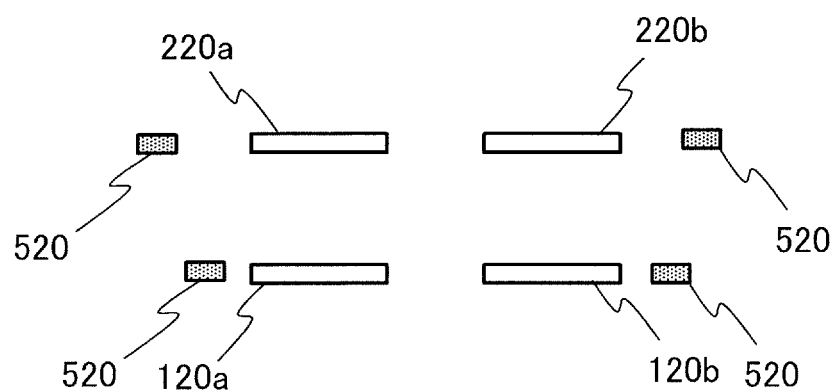
FIG. 12H is a diagram showing an example in which the third electrode 520 is arranged in the vicinity of both of the power transmitting electrodes 120a and 120b and in the vicinity of both of the power receiving electrodes 220a and 220b.

FIG. 12A to FIG. 12H show types of arrangement of the third electrode 520. FIG. 12A, shows an example in which the third electrode 520 is arranged, in the vicinity of only one power transmitting electrode 120*a*. FIG. 12B shows an example in which the third electrode 520 is arranged in the vicinity of both of the pair of power transmitting electrodes 120*a* and 120*b*. FIG. 12C shows an example in which the third electrode 520 is arranged in the vicinity of only one power receiving electrode 220*a*. FIG. 12D shows an example in which the third electrode 520 is arranged in the vicinity of both of the pair of power receiving electrodes 220*a* and 220*b*. FIG. 12E shows an example in which the third electrode 520 is arranged in the vicinity of one power transmitting electrode 120*b* and in the vicinity of one power receiving electrode 220*a*. FIG. 12F shows an example in which the third electrode 520 is arranged in the vicinity of one power transmitting electrode 120*b* and in the vicinity of one power receiving electrode 220*b*. FIG. 12G shows an example in which the third electrode 520 is arranged in the vicinity of both of the power transmitting electrodes 120*a* and 120*b* and in the vicinity of one the power receiving electrode 220*a*. FIG. 12H shows an example in which the third electrode 520 is arranged in the vicinity of both of the power transmitting electrodes 120*a* and 120*b* and in the vicinity of both of the power receiving electrodes 220*a* and 220*b*.

Thus, there are various embodiments for the arrangement of the third electrode 520. In the examples shown in FIG. 12E to FIG. 12H, the third electrode 520 is provided both for the power transmitting device and for the power receiving device. The third electrode 520 on the power transmitting side and the third electrode 520 on the power receiving side are arranged so as not to oppose each other. When power is transferred, the capacitance between the third electrode 520 on the power transmitting side and the third electrode 520 on five power receiving side is less than each of the capacitances between the power transmitting electrodes 120a and 120b and the power receiving electrodes 220a and 220b. With the power transmitting electrodes 120a and 120b and the power receiving electrodes 220a and 220b, they are arranged so as to oppose each other, thereby causing coupling capacity therebetween, contributing to power transfer. On the other hand, the third electrode 520 on the power transmitting side and the third electrode 520 on the power receiving side do not contribute to power transfer, and are therefore not needed to oppose each other. Rather, if two third electrodes 520 are arranged so as to oppose each other, unnecessary coupling occurs, producing an unnecessary electric field therebetween. Therefore, in the examples described above, the third electrode 520 on the power transmitting side and the third, electrode 520 on the power receiving side are arranged so as not to oppose each other.

Figure 13A:
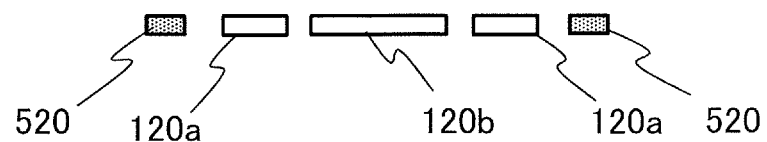
FIG. 13A is a cross-sectional view showing an example in which the first power transmitting electrode 120a is divided into two portions.
Figure 13B:
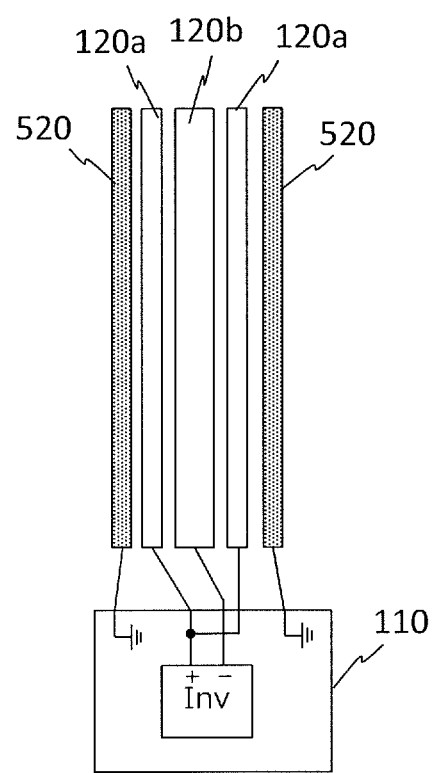
FIG. 13B is a top view showing an example in which the first power transmitting electrode 120a is divided into two portions.

FIG. 13A is a cross-sectional view showing another variation. FIG. 13B is a top view showing this variation. In this example, the first power transmitting electrode 120a is divided into two portions that extend in parallel to each other, with the second power transmitting electrode 120b arranged between the two portions. The width of each of the two portions of the first power transmitting electrode 120a is half the width of the second power transmitting electrode 120b. AC voltages of the same phase and the same amplitude from the inverter circuit are applied to the two portions of the first power transmitting electrode 120a. With this configuration, the electric field is canceled in regions over the boundaries between the two portions of the first power transmitting electrode 120a and the second power transmitting electrode 120b, and it is therefore possible to, at the same time, suppress the leak electric field in the height direction (the vertical direction in FIG. 13A).

With the configuration shown in FIGS. 13A and 13B, the first electrode of the power receiving device is also divided into two portions, with the second electrode located therebetween. The two portions of the first electrode 120a and the second electrode 120b of the power transmitting device are referred to as "a set of power transmitting electrodes". The two portions of the first electrode and the second electrode 120b of the power receiving device are referred to as "a set of power receiving electrodes". Electric power is transferred with the set of power transmitting electrodes and the set of power receiving electrodes opposing each other.

With the configuration shown in FIGS. 13A and 13B, the third electrode 520 is located on opposite sides of the two portions of the first power transmitting electrode 120a. The present disclosure is not limited to such an arrangement, and the third electrode 520 may be arranged on one side of the two portions. A configuration similar to the configuration of FIG. 7B may be employed, instead of connecting the third electrode to the ground terminal of the power transmitting circuit 110.

The second electrode 120b, rather than the first electrode 120a, may be divided into two portions that extend in parallel to each other, with the first electrode 120a arranged therebetween. The width of each divided electrode portion may not be equal to half the width of the electrode undivided. The width of each divided electrode portion may be set to 0.4 times or more and 0.6 times or less the width of the electrode undivided, for example, but may be set to a value outside this range.

Next, the configuration of the wireless power transmission system of the present embodiment that relates to power transfer will be described in greater detail. Note that the configuration of the system to be described below is an example, and may be changed as necessary depending on the function and performance required.

Figure 14:
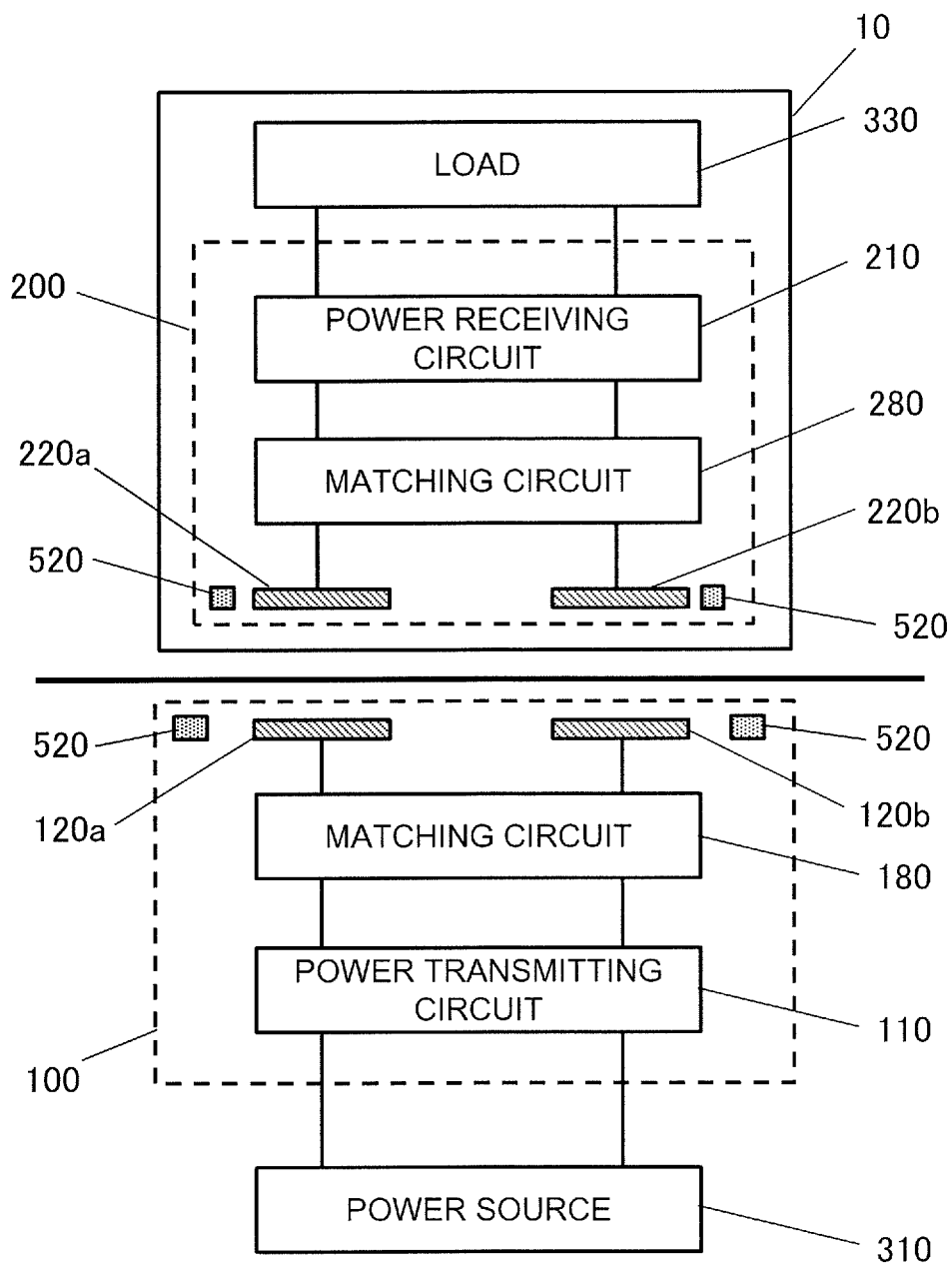
FIG. 14 is a block diagram generally showing a configuration that relates to power transmission of the wireless power transmission system of Embodiment 1.

FIG. 14 is a block diagram generally showing the configuration of the wireless power transmission system of the present embodiment that relates to power transfer. The power transmitting device 100 includes the power transmitting circuit 110 for converting electric power supplied, from an external power supply 310 into AC power for power transfer, the two power transmitting electrodes 120a and 120b for transmitting AC power, the third electrode 520, and a matching circuit 180 connected between the power transmitting circuit 110 and the power transmitting electrodes 120a and 120b. In the present embodiment, the power transmitting circuit 110 is electrically connected to the first and second power transmitting electrodes 120a and 120b via the matching circuit 180 therebetween, and outputs AC power to the first and second power transmitting electrodes 120a and 120b. The transport robot 10 includes the power receiving device 200 and the load 330.

The power receiving device 200 includes two power receiving electrodes 220a and 220b to be capacitively coupled to the two power transmitting electrodes 120a and 120b to receive electric power, the third electrode 520, a matching circuit 280 connected to the two power receiving electrodes 220a and 220b, and the power receiving circuit 210 connected to the matching circuit 280 for converting the received AC power into DC power and outputting the DC power. The first power receiving electrode 220a forms a capacitive coupling with the first power transmitting electrode 120a when the first power receiving electrode 220a opposes the first power transmitting electrode 120a. The second power receiving electrode 220b forms a capacitive coupling with the second power transmitting electrode when the second power receiving electrode 220b opposes the second power transmitting electrode 120b. AC power is contactlessly transferred from the power transmitting device 100 to the power receiving device 200 via these two capacitive couplings.

There is no particular limitation on the sizes of the housing of the transport robot 10, the power transmitting electrodes 120a and 120b and the power receiving electrodes 220a and 220b in the present, embodiment, and they may be set to the following values, for example. The lengths (sizes in the Y direction) of the power transmitting electrodes 120a and 120b and the third electrode 520 may be set within a range of 50 cm to 20 m, for example. The widths (the size in the X direction) of the power transmitting electrodes 120a and 120b may be set within a range of 5 cm to 2 m, for example. The widths of the third electrode 520 may be set within a range of 0.5 mm to 200 mm, for example. The size of the housing of the transport robot 10 in the direction of travel and that in the transverse direction may each be set within a range of 20 cm to 5 m, for example. The length (the size in the direction of travel) of the power receiving electrode 220a may be set within a range of 5 cm to 2 m, for example. The width (the size in the transverse direction) of the power receiving electrode 220a may be set within a rage of 2 cm to 2 m, for example. The gap between power transmitting electrodes and the gap between power receiving electrodes may be set within a range of 1 mm to 40 cm, for example. Note however that the present disclosure is not limited to these numerical ranges.

The load 330 may include a driving electric motor, a capacitor for storing electricity or a secondary battery. The load 330 is driven or charged by the DC power output from the power receiving circuit 210.

The electric motor may be any motor such, as a DC motor, a permanent magnet synchronous motor, an induction motor, a stepper motor and a reluctance motor. The motor rotates the wheels of the transport robot 10 via shafts, gears, etc., to move the transport robot 10. Depending on the type of the motor, the power receiving circuit 210 may include various types of circuits such as a rectifier circuit, an inverter circuit and an inverter control circuit. In order to drive an AC motor, the power receiving circuit 210 may include a converter circuit for directly converting the frequency (transmission frequency) of the received energy (electric power) to the frequency for driving the motor.

The capacitor may be a high-capacity, low-resistance capacitor such as an electric double layer capacitor or a lithium ion capacitor, for example. By using such a capacitor as a condenser, it is possible to realize faster charging than when a battery (secondary battery) is used. Note that a secondary battery (e.g., a lithium, ion battery, etc.) may be used instead of a capacitor. In such a case, more energy can be stored although charging will take longer. The vehicle 10 drives the motor using the electric power stored in a capacitor: or a secondary battery to move around.

As the vehicle 10 moves, the amount of electric power stored in the capacitor or the secondary battery (the charging amount) decreases. Therefore, recharging is needed to keep moving. In view of this, when the charging amount decreases below a predetermined threshold value while moving, the transport robot. 10 moves close to the power transmitting device 100 for charging. The power transmitting device 100 may be installed at a plurality of locations in a factory.

Figure 15:
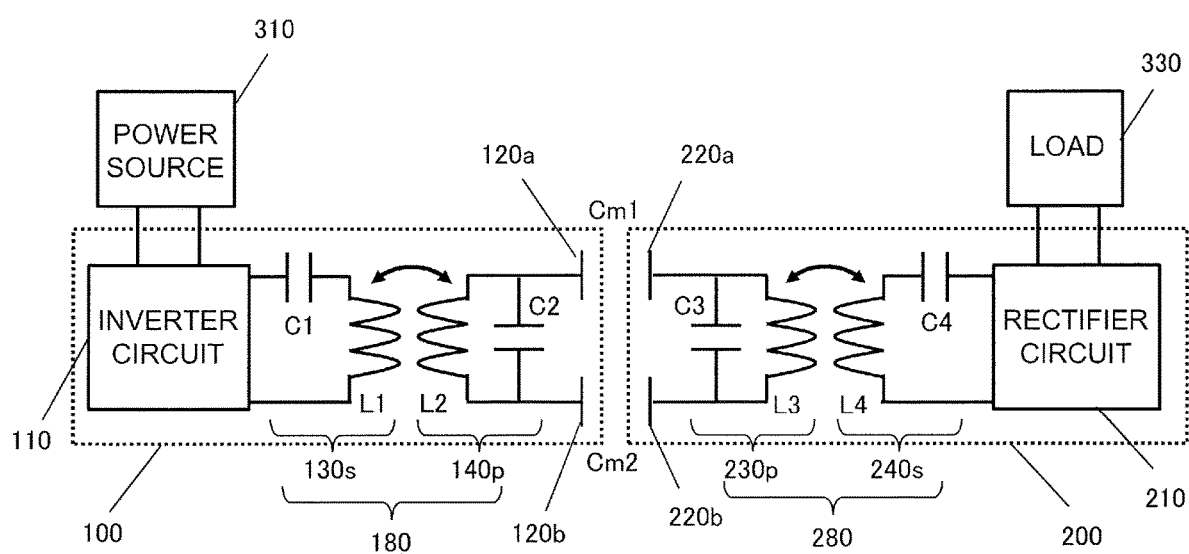
FIG. 15 is a circuit diagram showing a more detailed configuration example of the wireless power transmission system.

FIG. 15 is a circuit diagram showing a more detailed configuration example of the wireless power transmission system. In the illustrated example, the matching circuit 180 of the power transmitting device 100 includes a series resonant circuit 130s that is connected to the power transmitting circuit 110, and a parallel resonant circuit 140p that is connected to the power transmitting electrodes 120a and 120b and inductively coupled to the series resonant, circuit 130s. The matching circuit 180 has the function of matching the impedance of the power transmitting circuit 110 with the impedance of the power transmitting electrodes 120a and 120b. The series resonant circuit 130s of the power transmitting device 100 has a configuration in which the first coil L1 and the first capacitor C1 are connected in series with, each other. The parallel resonant circuit 140p of the power transmitting device 100 has a configuration in which the second coil L2 and the second capacitor C2 are connected in parallel to each other. The first coil L1 and the second coil L2 are coupled together with a predetermined coupling coefficient to form a transformer. The turns ratio between the first coil L1 and the second coil L2 is set to such a value that an intended transformer ratio (step-up ratio or step-down ratio) is realized.

The matching circuit 280 of the power receiving device 200 includes a parallel resonant circuit 230p that is connected to the power receiving electrodes 220a and 220b, and a series resonant circuit 240s that is connected to the power receiving circuit 210 and inductively coupled to the parallel resonant circuit 230p. The matching circuit 280 has the function of matching the impedance of the power receiving electrodes 220a and 220b with the impedance of the power receiving circuit 210. The parallel resonant circuit 230p has a configuration in which the third coil L3 and the third capacitor C3 are connected in parallel to each other. The series resonant circuit 240s of the power receiving device 200 has a configuration in which the fourth coil L4 and the fourth capacitor C4 are connected in series with each other. The third coil L3 and the fourth coil L4 are coupled together with a predetermined coupling coefficient to form a transformer. The turns ratio between the third coil L3 and the fourth coil L4 is set to such a value that an intended transformer ratio is realized.

Note that the configuration of the matching circuits 180 and 280 is not limited to that shown in FIG. 15. For example, a parallel resonant circuit may be provided instead of each of the series resonant, circuits 130s and 240s. A series resonant circuit may be provided instead of each of the parallel resonant circuits 140p and 230p. Moreover, one or both of the matching circuits 180 and 280 may be omitted. When the matching circuit 180 is omitted, the power transmitting circuit 110 and the power transmitting electrodes 120a and 120b are connected directly to each other. When the matching circuit 280 is omitted, the power receiving circuit 210 and the power receiving electrodes 220a and 220b are connected directly to each other. Herein, the configuration in which the matching circuit 180 is provided falls within the definition of a configuration in which the power transmitting circuit 110 and the power transmitting electrodes 120a and 120b are electrically connected to each other. Similarly, the configuration in which the matching circuit 280 is provided falls within the definition of a configuration in which the power receiving circuit 210 and the power receiving electrodes 220a and 220b are electrically connected to each other.

Figure 16A:
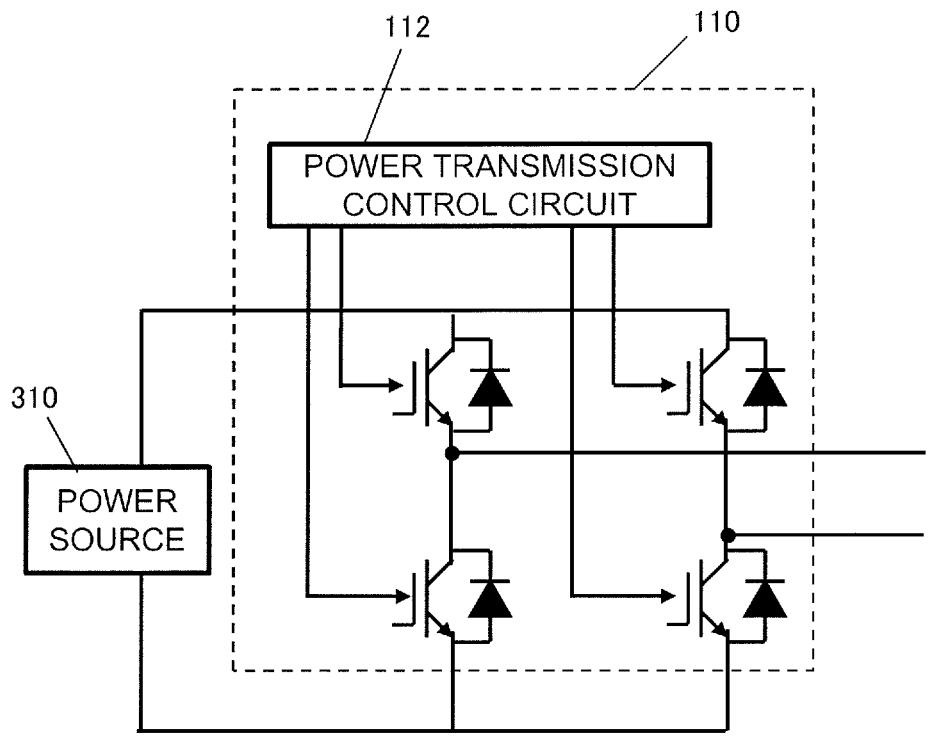
FIG. 16A is a diagram schematically showing a configuration example of a power transmitting circuit 110.

FIG. 16A is a diagram schematically showing a configuration example of the power transmitting circuit 110. In this example, the power transmitting circuit 110 includes a full bridge inverter circuit including four switching elements (e.g., transistors such as IGBTs or MOSFETs), and a control circuit 112. The control circuit 112 includes a gate driver for outputting control signals for controlling ON (conducting) and OFF (non-conducting) of the switching elements, and a processor such as a microcontroller for causing the gate driver to output the control signals. A half bridge inverter circuit or another oscillation circuit such as a class S may be used instead of a full bridge inverter circuit shown in the figure. The power transmitting circuit 110 may include a communication modem, and various sensors for measuring the voltage, the current, etc. When a communication modem is provided, the data can be transmitted to the power receiving device 200 while being superimposed over AC power. When the power supply 310 is an AC power supply, the power transmitting circuit 110 converts the input AC power into another form of AC power having a different frequency or voltage.

Note that the present disclosure includes an embodiment in which a weak AC signal (e.g., a pulse signal) is transmitted to the power receiving device 200 not for the purpose of power transfer but for the purpose of transmitting data. Even in such an embodiment, it can be said that weak electric power is transmitted. Therefore, transmitting a weak AC signal (e.g., a pulse signal) also falls under the concept of "power transmission" or "power transfer". Also, such a weak AC signal falls under the concept of "AC power".

Figure 16B:
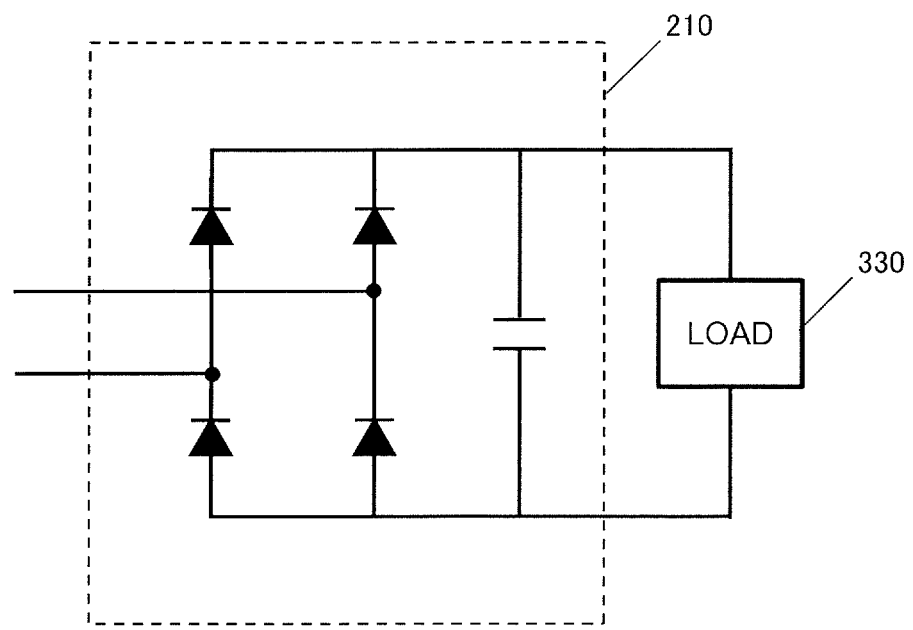
FIG. 16B is a diagram schematically showing a configuration example of a power receiving circuit 210.

FIG. 16B is a diagram schematically showing a configuration example of the power receiving circuit 210. In this example, the power receiving circuit 210 is a full-wave rectifier circuit including a diode bridge and a smoothing capacitor. The power receiving circuit 210 may have another rectifier configuration. In addition to a rectifier circuit, the power receiving circuit 210 may include various circuits such as a constant voltage-constant current control circuit or a communication modem. The power receiving circuit 210 converts the received AC energy into a DC energy that can be used by the load 330. Various sensors for measuring the voltage, the current, etc., output from the series resonant circuit 240s may be included in the power receiving circuit 210.

The coils of the resonant circuits 130s, 140p, 230p and 240s may each be a planar coil or a laminated coil formed on a circuit board, or a wound coil of a copper wire, a litz wire, or a twist wire, for example. The capacitors of the resonant circuits 130s, 140p, 230p and 240s may each be any typo of a capacitor that has a chip shape or a lead shape, for example. The capacitance between two wires with the air therebetween may serve as these capacitors. The self-resonance property of each coil may be used instead of these capacitors.

The power supply 310 may be any power supply such as a commercial power supply, a primary battery, a secondary battery, a solar battery, a fuel cell, a USB (Universal Serial Bus) power supply, a high-capacity capacitor (e.g., an electric double layer capacitor), or a voltage converter connected to a commercial power supply, for example. While the power supply 310 is a DC power supply in the present embodiment, it may be an AC power supply.

The resonant frequency f0 of each of the resonant circuits 130s, 140p, 230p and 240s is typically set so as to coincide with the transmission frequency f1 when power is transferred. The resonant frequency f0 of each of each of the resonant circuits 130s, 140p, 230p and 240s does not need to strictly coincide with the transmission frequency f1. Each resonant frequency f0 may be set to a value that is in the range of about 50% to about 150% of the transmission frequency f1, for example. The frequency f1 of power transfer may be set to, for example, 50 Hz to 300 GHz, more preferably 20 kHz to 10 GHz, and even more preferably 79 kHz to 20 MHz, and yet more preferably 79 kHz to 7 MHz.

In the present embodiment, there is a gap between the power transmitting electrodes 120a and 120b and the power receiving electrodes 220a and 220b, and the distance therebetween is relatively long (e.g., about 10 mm). Therefore, capacitances Cm1 and Cm2 between the electrodes are very small, and the impedience of the power transmitting electrodes 120a and 120b and the power receiving electrodes 220a and 220b is very high (e.g. about several kΩ). In contrast, the impedance of the power transmitting circuit 110 and the power receiving circuit 210 is as low as about several Ω, for example. In the present embodiment, the parallel resonant circuits 140p and 230p are arranged on the side closer to the power transmitting electrodes 120a and 120b and the power receiving electrodes 220a and 220b, respectively, and the series resonant circuits 130s and 240s are arranged on the side closer to the power transmitting circuit 110 and the power receiving circuit 210, respectively. With such a configuration, it is easy to match the impedance. The series resonant circuit whose impedance becomes zero (0) at resonance is suitable for matching with an external circuit having a low input/output impedance. On the other hand, the parallel resonant circuit whose impedance becomes infinite at resonance is suitable for matching with an external circuit having a high input/output impedance. Therefore, it is possible to easily realize an impedance matching by arranging the series resonant circuits at connecting points on the side of the power supply circuit having a low input impedance and arranging the parallel resonant circuits at connecting points on the side of the electrodes having a high output impedance, as in the configuration shown in FIG. 15. Similarly, it is possible to desirably realize an impedance matching of the power receiving device 200 by arranging the parallel resonant circuits on the electrode side and arranging the series resonant circuits on the load side.

Note that the impedance of the electrode is low in a configuration in which the distance between the power transmitting electrodes 120a and 120b and the power receiving electrodes 220a and 220b is shortened or a dielectric is arranged therebetween. In such a case, it is not necessary to employ an asymmetric resonant circuit configuration as described above. When there is no impedance matching issue, the matching circuits 180 and 280 themselves may be omitted.

In the example of FIG. 14, the third electrode 520 is arranged inside the power receiving device 200, i.e., inside the transport robot 10. The present disclosure is not limited to such a configuration, but the third electrode 520 may be arranged outside the power receiving device 200, or outside the transport robot 10. For example, the third electrode 520 may be formed on the outside of the housing of the power receiving device 200.

Figure 17:
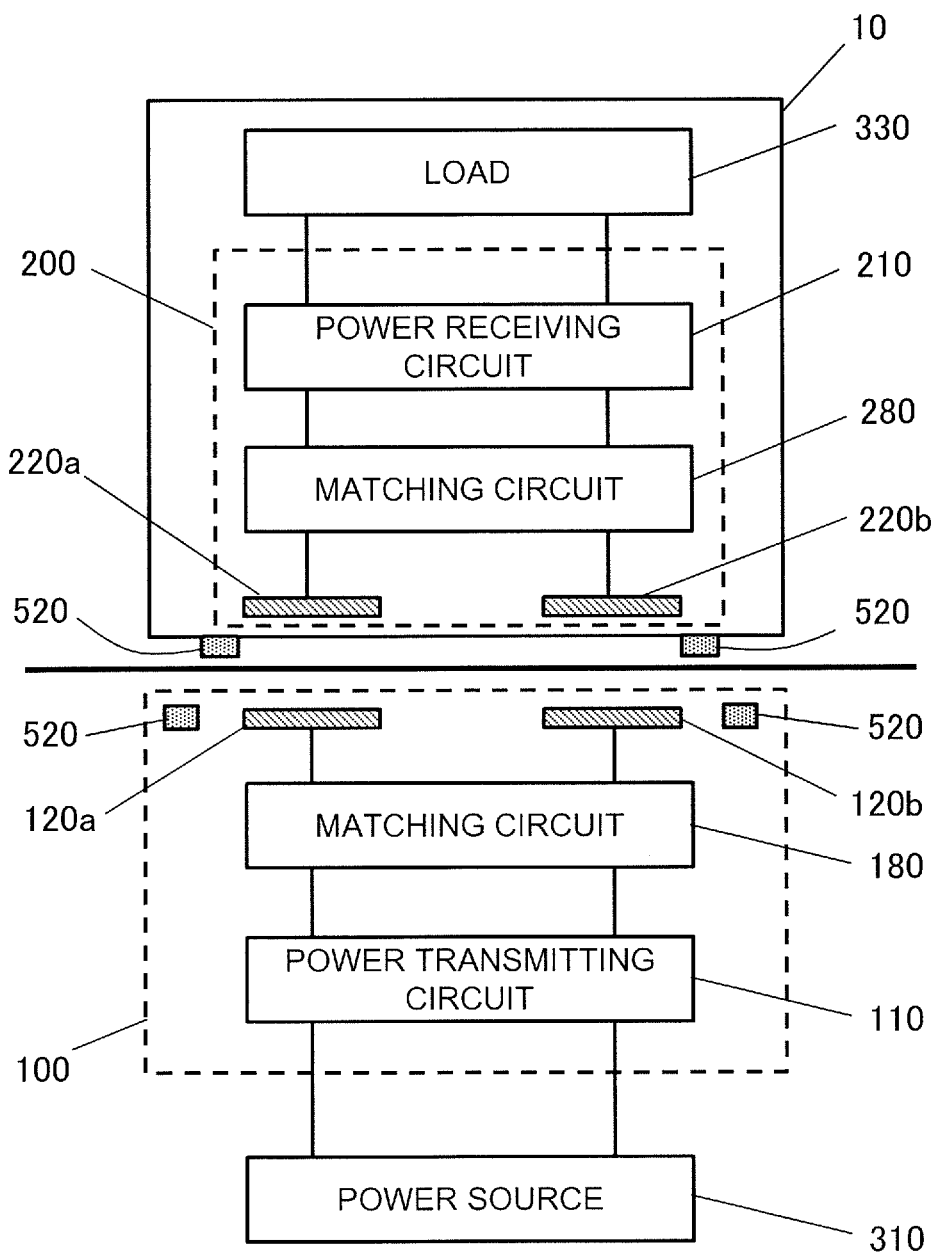
FIG. 17 is a block diagram showing a variation of Embodiment 1.

FIG. 17 is a diagram showing an example in which the third electrode 520 is arranged on the bottom of the outer wall surface of the housing of the transport robot 10. Thus, the third electrode 520 may be arranged, on the outside of the housing of a device (the transport robot 10 in this example) in which the power receiving device 200 is installed. With such a configuration, even when there is no space for arranging the third electrode 520 inside the housing, it is possible to realize the advantageous effect of suppressing the leak electric field by the third electrode 520.

Note that it is assumed, in the above description, that the transport robot 10 includes the power receiving device 200 therein, but the transport robot 10 itself may be regarded as being a power receiving device. Moreover, any device that includes an "electrode unit" for receiving power may be called a "power receiving device". Therefore, "the housing of the power receiving device" refers not only to a housing inside the device such as the transport robot 10, but also to a housing of the device itself. At least a portion of the third electrode may be arranged on the housing of the power receiving device.

Figure 18:
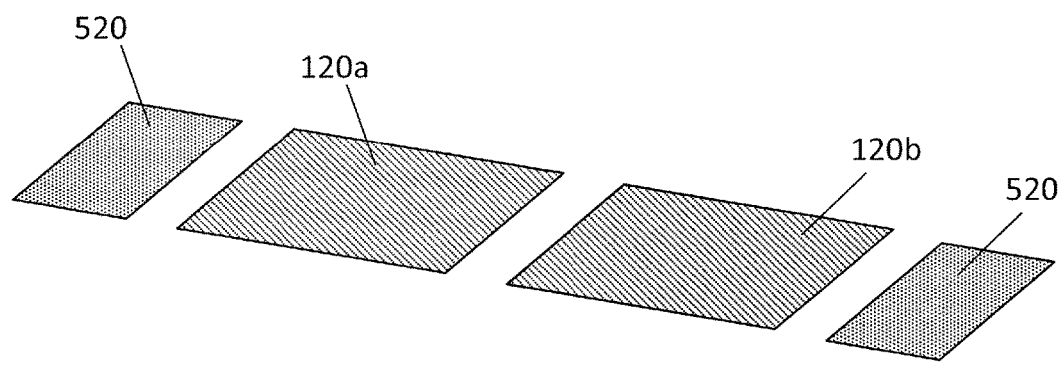
FIG. 18 is a perspective view schematically showing an arrangement of the power transmitting electrodes 120a and 120b and the third electrode 520 according to another embodiment of the present disclosure.
Figure 19:
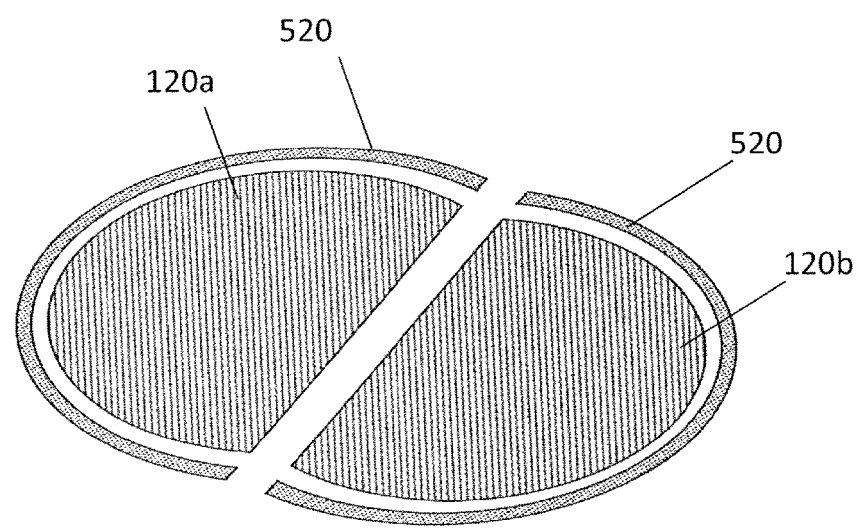
FIG. 19 is a perspective view schematically showing an arrangement of the power transmitting electrodes 120a and 120b and the third electrode 520 according to still another embodiment of the present disclosure.

FIG. 18 and FIG. 19 are perspective views each schematically showing the arrangement of the power transmitting electrodes 120a and 120b and the third electrode 520 according to other variations of the present disclosure. In the example of FIG. 18, the power transmitting electrodes 120a and 120b each have a rectangular shape elongated in the width direction. In the example of FIG. 19, the power transmitting electrodes 120a and 120b are each shaped like a portion of an ellipse. Thus, the power transmitting electrodes 120a and 120b do not always need to extend in a stripe shape. The third electrode 520 may be arranged adjacent to the opposite sides of the electrodes 120a and 120b.

Figure 20:
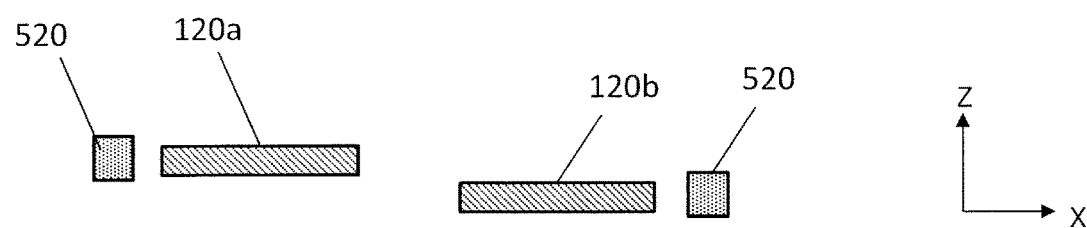
FIG. 20 is a cross-sectional view schematically showing an arrangement of the power transmitting electrodes 120a and 120b and the third electrode 520 according to still another embodiment, of the present disclosure.

FIG. 20 is a cross-sectional view; schematically showing the arrangement of the power transmitting electrodes 120a and 120b and the third electrode 520 according to still another variation of the present disclosure. In the example of FIG. 20, the surfaces of the power transmitting electrodes 120a and 120b are not coplanar. Thus, the surfaces of the power transmitting electrodes 120a and 120b do not need to be coplanar. A configuration as shown in FIG. 20 also falls within the definition of a configuration in which the second power transmitting electrode 120b is spaced apart in the direction along the surface of the first power transmitting electrode 120a.

Note that the surfaces of the power transmitting electrodes and the power receiving electrodes do not need to have a completely planar shape, but may have a curved surface or a shape with protrusions/depressions, for example. Such a surface also falls within the definition of a "planar surface" as long as it is generally planar. The power road surface.

Embodiment 2

Next, an embodiment in which the transport robot 10 includes an electronic device will be described.

Various electronic device may be installed on the transport robot 10. For example, a sensor detecting a moveable object therearound such as a human, an animal or another vehicle may be installed. Alternatively, an electronic device such as a sensor for reading location detecting marks arranged on the floor surface may be installed.

Figure 21:
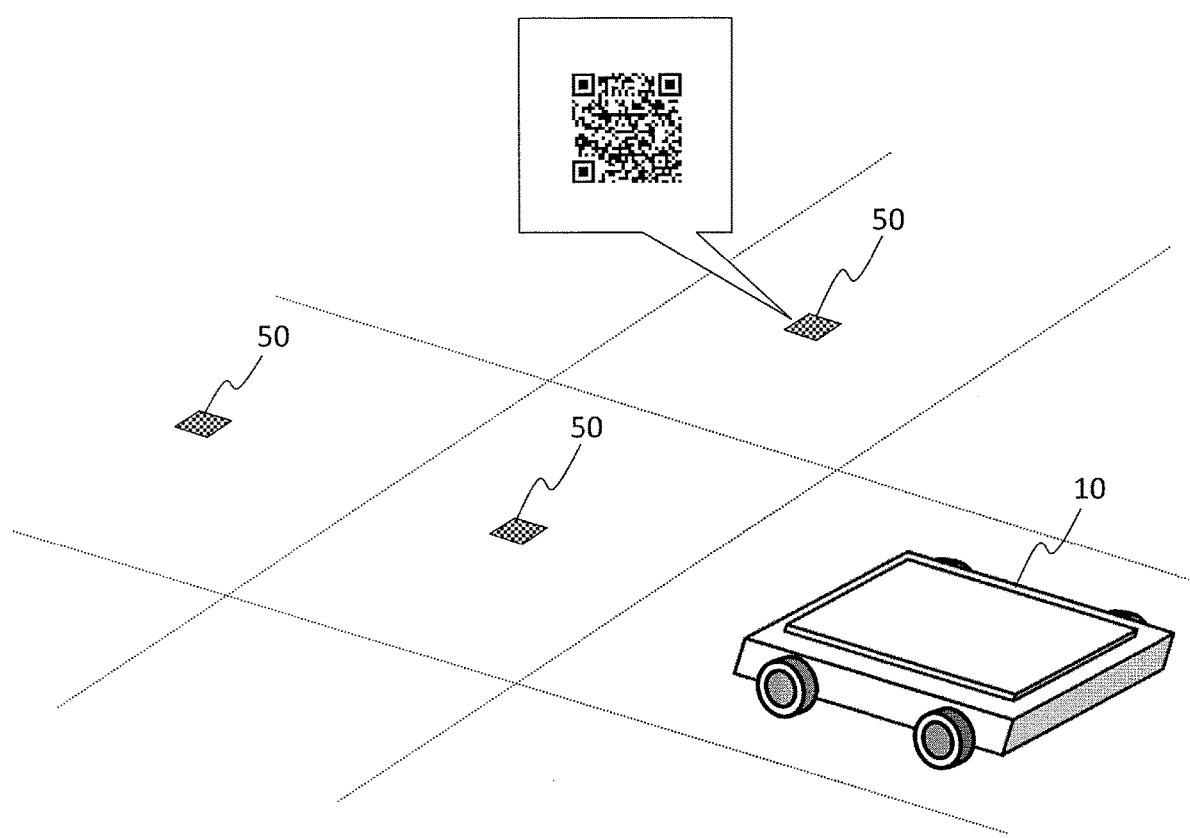
FIG. 21 is a diagram showing an example of a factory where a plurality of location detecting marks are arranged on the floor surface.

FIG. 21 is a diagram showing an example of a factory where a plurality of location detecting marks are arranged on the floor surface. In this example, a mark 50 including a two-dimensional code such as a QR code (registered trademark), for example, is provided at a plurality of locations on the floor surface. The transport robot 10 includes an imaging device (i.e., an image sensor) for reading the mark 50 provided on the bottom surface of the housing. The two-dimensional code of the mark 50 represents the coordinates of the location. By capturing the image of the mark. 50 by means of an imaging device, the transport robot 10 obtains location information recorded in the mark 50. Therefore, the transport robot 10 can recognize the location of itself.

While the mark 50 includes a two-dimensional code in this example, it may include a one-dimensional code (e.g., a barcode). Alternatively, an RF tag may be provided instead of the mark 50. In such a case, the transport robot 10 includes an electronic device such as an antenna and a communication device for communicating with the RF tag via radio waves or electromagnetic induction. When an RF tag is used, it is possible to provide more information to the transport robot 10 than when a two-dimensional code is used.

With a vehicle system as shown in FIG. 21, the transport robot 10 will pause or slow down at the position of a mark 50 for reading information. It is efficient if power can be transmitted at this point in time. In view of this, the present inventor considered making a vehicle system, in which power can be transmitted and information can be read at the same time.

Figure 22:
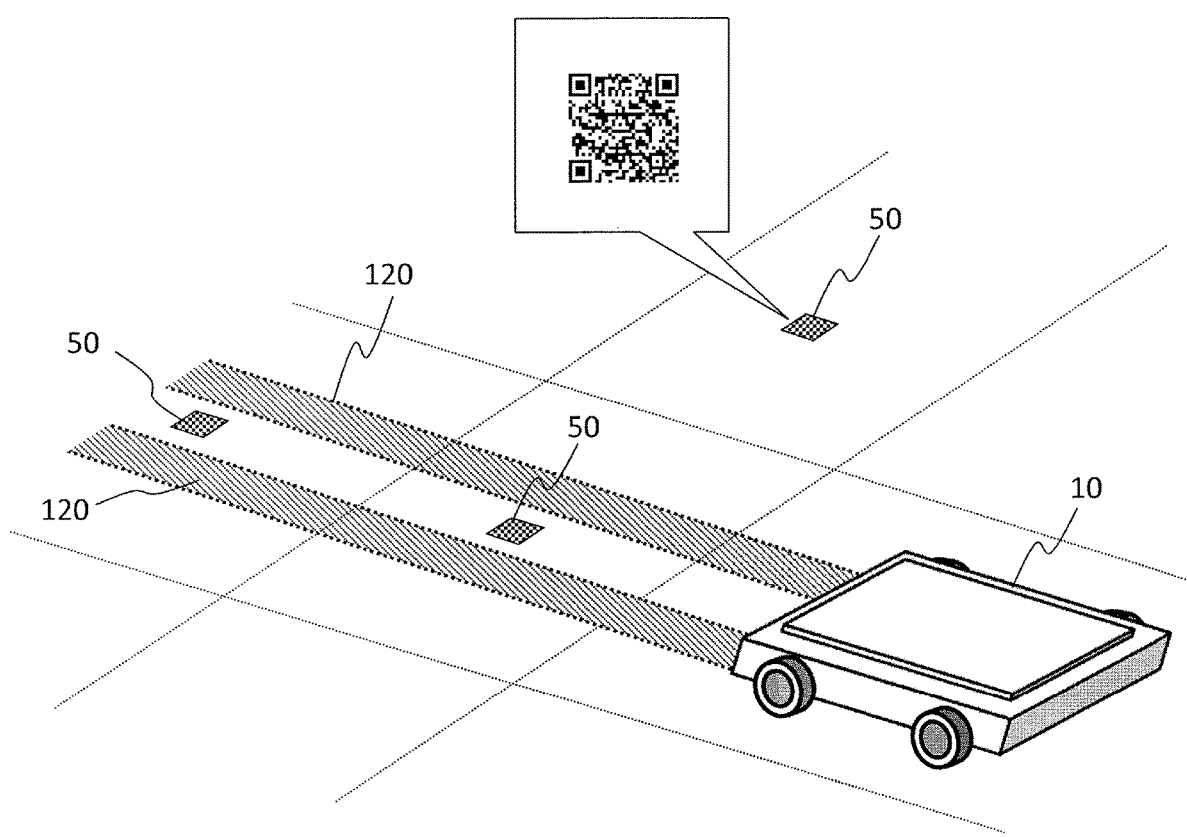
FIG. 22 is a diagram schematically showing an example of a vehicle system in which power is transferred and information is read at the same time.

FIG. 22 is a diagram schematically showing an example of a vehicle system in which power is transmitted and information is read at the same time. With this system, a plurality of marks 50 are arranged between a pair of power transmitting electrodes 120 installed on the floor surface. An imaging device is arranged on the bottom surface of the transport robot 10. The imaging device reads information recorded in a mark 50 while electric power is being transmitted from the power transmitting electrodes 120 to the power receiving electrodes 220.

With such a system, the influence of the electric field leaking into the imaging device is not negligible. Particularly, when a large amount of electric power is transferred, a high voltage is applied to the power transmitting electrodes 120. Then, the electric field leaking from the power transmitting electrodes 120 and the power receiving electrodes 220 into the surrounding space may become strong. As a result, the possibility of affecting the operation of the imaging device cannot be denied.

This problem is not limited to imaging devices, but may similarly occur to other sensing devices. For example, similar problems may occur also when a sensing device such as a human detection sensor, an obstruction detection sensor, an RFID reader, a wireless communication device or an ultrasonic sensor is arranged in the vicinity of the group of power receiving electrodes. Electronic circuits for driving the sensing device described above and for making decisions based on the obtained information may be installed on the electronic device. The interference with these electronic circuits is also a problem.

In the present embodiment, the third electrode described above is arranged in the vicinity of the electronic device installed on the vehicle. For example, the third electrode is arranged between a pair of power receiving electrodes of the vehicle. The electronic device is arranged between two power receiving electrodes as viewed from a direction perpendicular to the electrode installation plane. With such a configuration, it is possible to suppress the influence of the electric field leaking into the sensing device in the electronic device.

Figure 23:
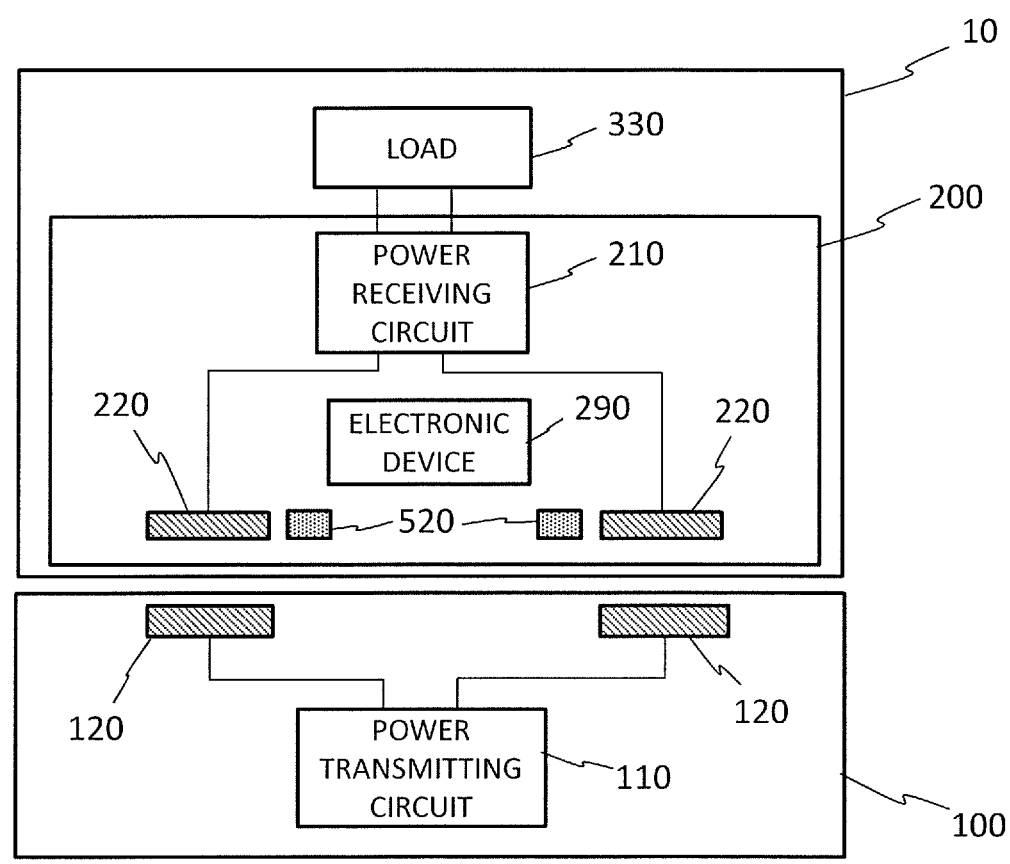
FIG. 23 is a block diagram showing a configuration example of a system according to Embodiment 2.

FIG. 23 is a block diagram showing a configuration example of a system according to the present embodiment. In the present embodiment, in addition to a pair of power receiving electrodes 220 and the power receiving circuit 210, the power receiving device 200 of the transport robot 10 includes an electronic device 290 for reading information recorded in the mark 50 and two third electrodes 520 between the pair of power receiving electrodes 220. The power transmitting device 100 includes the power transmitting circuit 110 and a pair of power transmitting electrodes 120. While no third electrode is arranged in the power transmitting device 100 in the present embodiment, third electrodes may be arranged also in the vicinity of the pair of power transmitting electrodes 120.

Figure 24A:
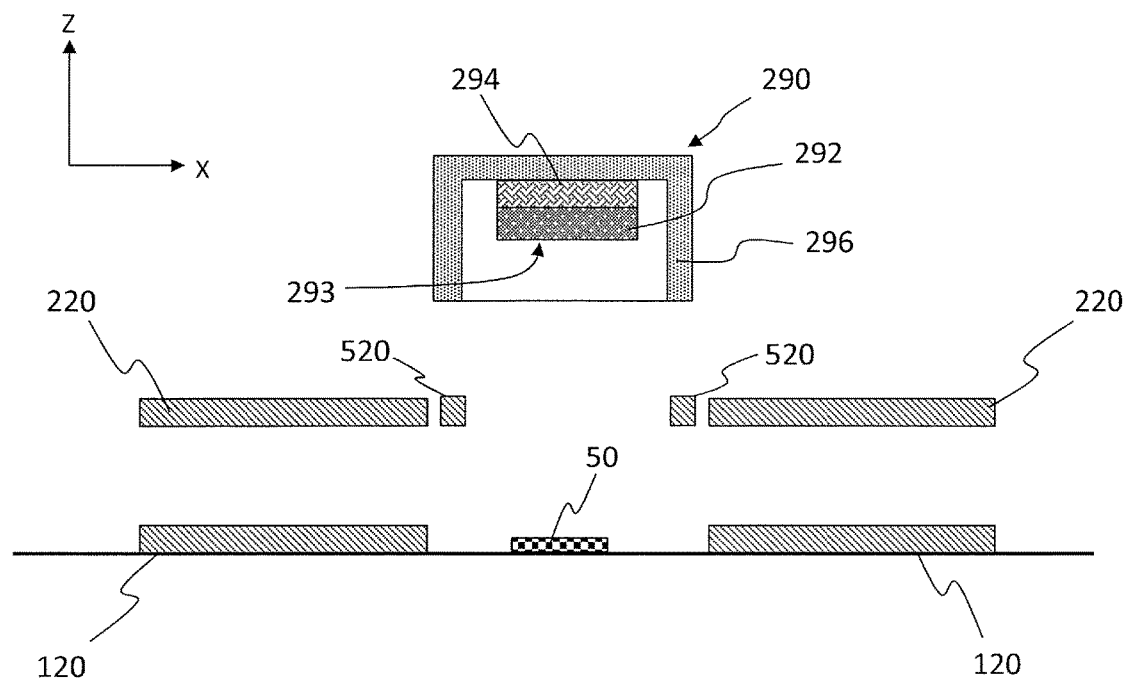
FIG. 24A is a cross-sectional view schematically showing an example of a configuration and an arrangement of a system having an electronic device.

FIG. 24A is a cross-sectional view schematically showing an example of a configuration and an arrangement of the electronic device 290. The electronic device 290 of the present embodiment includes an imaging device 292, a control circuit 294 for controlling the imaging device 292, and a conductive member 296 for accommodating the imaging device 292 and the control circuit 294. Although not shown in FIG. 24, the electronic device 290 may include an optical system such as a lens for forming an image on a light-receiving surface 293 of the imaging device 292.

The conductive member 296 includes a bottom portion supporting the control circuit 294 and the imaging device 292, and a tubular side portion. The conductive member 296 may be made of a normal conductive material that is not light-transmissive. The conductive member 296 surrounds the imaging device 292 and the control, circuit 294.

In the present embodiment, the power transmitting electrodes 120 and the power receiving electrodes 220 have planar surfaces, and are substantially parallel to the floor surface. The two power transmitting electrodes 120 are arranged on the floor surface. The two power receiving electrodes 220 and the two third electrodes 520 are located on the same plane that is substantially parallel to the floor surface. The mark 50, which is a sensing target, is located between two power transmitting electrodes 120 adjacent to each other.

As viewed from a direction perpendicular to the electrodes, the center of the light-receiving surface 293 of the imaging device 292 is aligned with the gap between two power receiving electrodes 220 adjacent to each other. That is, the imaging device 292 is arranged so that the light-receiving surface 293 thereof faces the floor surface without opposing any of the power receiving electrodes 220. The X coordinate of the center of the light-receiving surface 293 may coincide with, or may be slightly shifted from, the X coordinate of the center of the gap between the two power receiving electrodes 220. A transparent member may be located between the light-receiving surface 293 and the floor surface.

When the imaging device 292 captures the image of a mark 50, light enters the light-receiving surface 293 of the imaging device 292 from a mark 50 that is being observed. On the other hand, the leak electric field, produced around the electrodes because of the power transfer, is reduced by the two third electrodes 520. Therefore, it is possible to reduce the influence of electromagnetic noise on the imaging device 292. In the present embodiment, since the conductive member 296 is arranged, it is possible to further reduce the influence of electromagnetic noise on the imaging device 292.

Note that a transparent conductive member may be located between the light-receiving surface 293 of the imaging device 292 and the floor surface. When such a transparent conductive member is provided, it is possible to further suppress the leak electric field from the electrodes.

The transparent conductive member is made of a material that is light-transmissive (i.e., that allows visible light to pass therethrough) and conductive. For example, a transparent conductive material such as ITO (indium tin oxide), IZO (indium zinc oxide) or PEDGT:PSS (a mixture of polythiophene and polystyrenesulfonic acid) may be used.

The conductive member 296 may be formed from a common conductor that is not light-transmissive. For example, any conductive material such as aluminum, iron, copper or an alloy may be used. Note that the conductive member 296 may also be made of a transparent conductive material.

In response to an instruction from the control circuit 294, the imaging device 292 captures the image of the mark 50 and generates image data. From the generated image data, the control circuit 294 reads a two-dimensional code and obtains information such as the location indicated by the code. The obtained location information can be sent to a controller (not shown), for example, and used for controlling the travel of the transport robot 10.

Figure 24B:
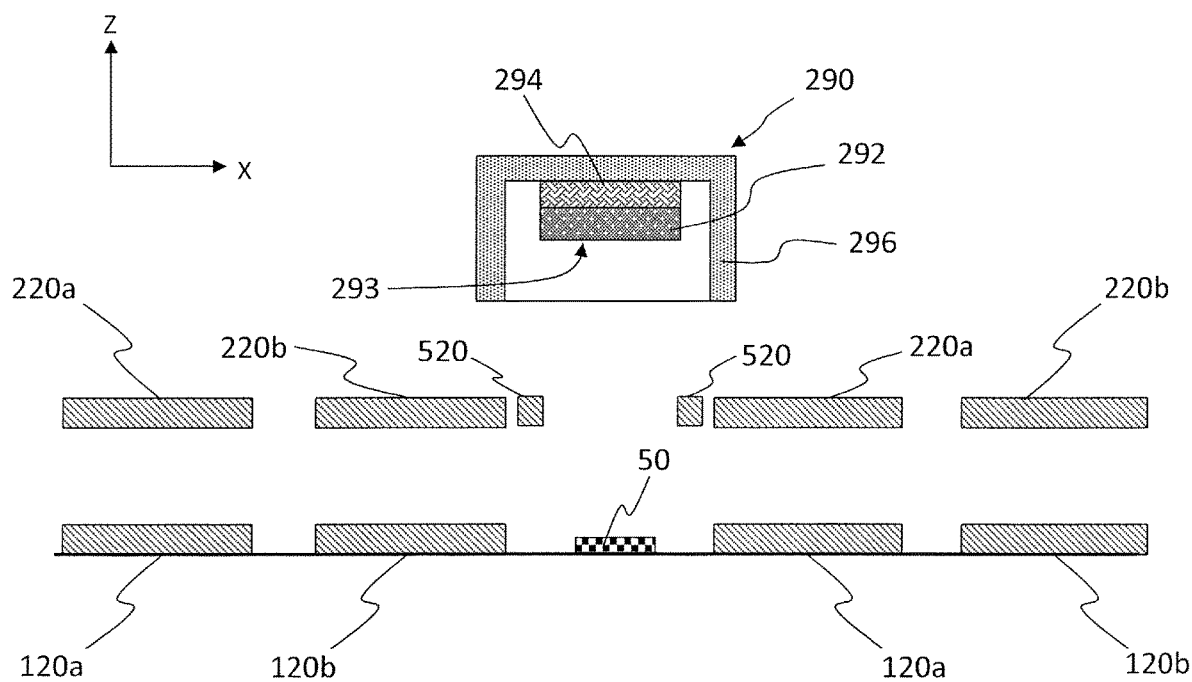
FIG. 24B is a cross-sectional view schematically showing another example of a configuration and an arrangement of a system having an electronic device.

FIG. 24B is a diagram showing another example of a wireless power transmission system including the electronic device 290. In this example, each power transmitting electrode is divided into a plurality of portions and each power receiving electrode is divided into a plurality of portions. The first power transmitting electrode 120a divided into two portions and the second power transmitting electrode 120b divided into two portions are arranged alternating with each other in the X direction. Similarly, the first power receiving electrode 220a divided into two portions and the second power receiving electrode 220b divided into two portions are arranged alternating with each other in the X direction. First AC voltages of the same phase are applied to the two portions of the first power transmitting electrode 120a. Second AC voltages antiphase to the first voltages are applied to two portions of the second power transmitting electrode 120b. For each of the group of power transmitting electrodes and the group of power receiving electrodes, the inter-electrode gap in the central portion is greater than that on the outer side. The mark 50 is arranged between the inner two electrodes 120a and 120b of the group of power transmitting electrodes. The two third electrodes 520 are arranged between the inner two electrodes 220a and 220b of the group of power receiving electrodes.

With such a configuration, the electric field is canceled in regions over the boundaries between the two portions of the first power transmitting electrode 120a and the two portions of the second power transmitting electrode 120b. Similarly, the electric field is canceled in regions over the boundaries between the two portions of the first power receiving electrode 220a and the two portions of the second power receiving electrode 220b. Therefore, it is possible to suppress, at the same time, the leak electric field in the height direction (the vertical direction in FIG. 24B). Thus, it is possible to further suppress the leak electric field by not only arranging the third electrode 520 but also employing a configuration in which each electrode is divided into portions.

While the mark 50, which is a sensing target, is arranged between two adjacent power transmitting electrodes in the examples shown in FIG. 24A and FIG. 24B, it may be arranged at any other position. For example, the mark 50 may be arranged on any of the power transmitting electrodes 120.

Figure 25:
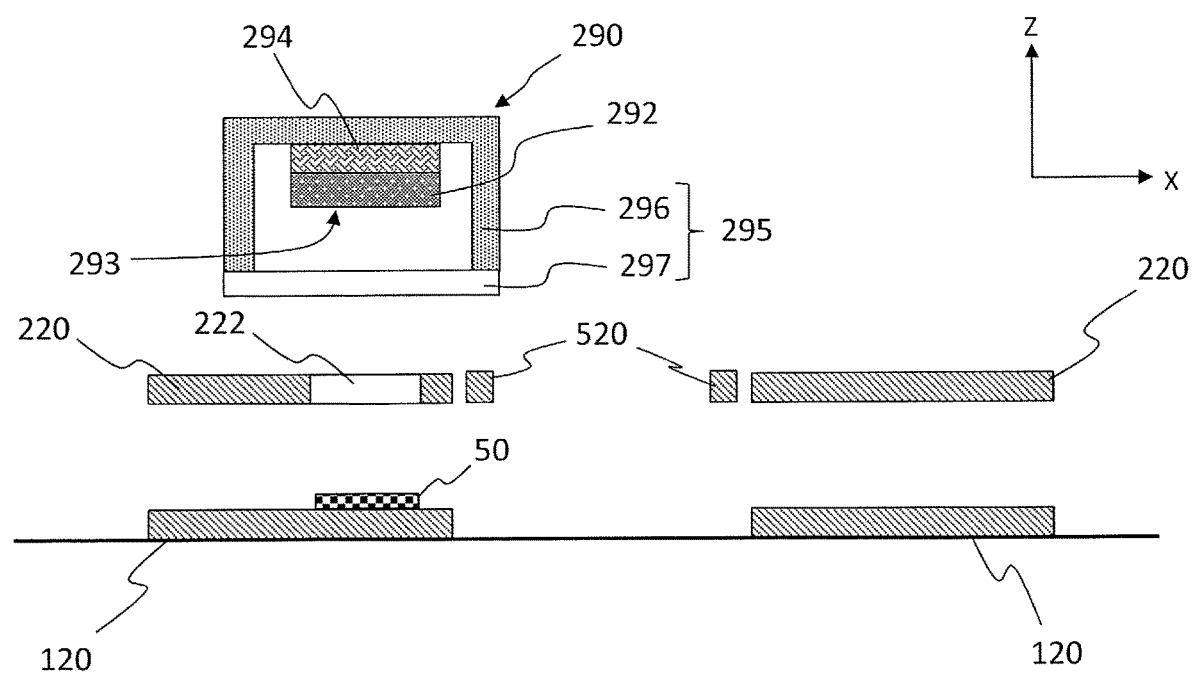
FIG. 25 is a diagram showing a variation of the configuration of FIG. 24A.
Figure 26A:
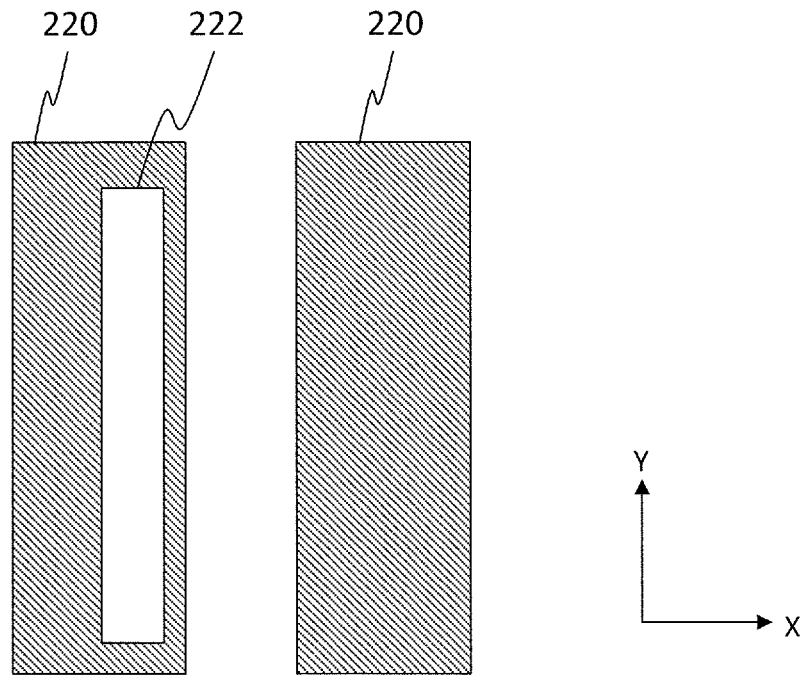
FIG. 26A is a diagram showing an example of a configuration of a transparent region of a power: receiving electrode.

FIG. 25 is a cross-sectional view showing an example in which the mark 50 is arranged on one of the power transmitting electrodes 120. FIG. 26A is a diagram showing the two power receiving electrodes 220 of FIG. 25 as viewed from a direction perpendicular to the surface of the power receiving electrodes 220. In this example, the power receiving electrode 220 that, opposes the power transmitting electrode 120 on which the mark 50 is arranged includes a transparent region 222. With the plurality of power receiving electrodes 220 opposing the plurality of power transmitting electrodes 120, respectively, the transparent region 222 is located directly above the mark 50. The light-receiving surface 293 of the imaging device 292 is located so as to receive light from the mark 50 having passed through the transparent region 222.

The electronic device 290 shown in FIG. 25 includes a shielding member 235, which includes the conductive member 296 and a transparent conductive material 297. The conductive member 296 includes a bottom portion supporting the control circuit 294 and the imaging device 292, and a tubular side portion. The transparent conductive material 297 has a plate-like, membrane-like or film-like structure. The transparent conductive material 297 may be called a transparent conductive plate, a transparent conductive membrane, or a transparent conductive film. The transparent conductive material 297 is bonded to the conductive member 296. The transparent conductive material 297 and the conductive member 296 surround the imaging device 292 and the control circuit 294.

When the imaging device 292 captures the image of the mark 50, the transparent conductive material 297 is located on the path of light traveling from the mark 50 that is being observed toward the light-receiving surface 293 of the imaging device 292. Therefore, light passes through the transparent conductive material 297 to enter the imaging device 292. On the other hand, the leak electric field around the electrodes caused by power transfer is shielded by the third electrode 520, the transparent conductive material 297 and the conductive member 296. Therefore, it is possible to reduce the influence of electromagnetic noise caused by power transfer.

Figure 26B:
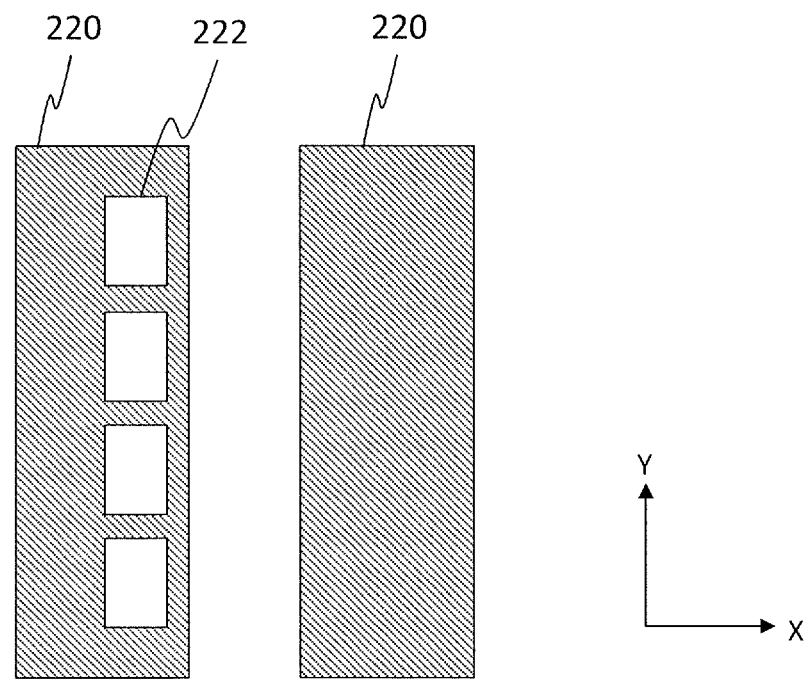
FIG. 26B is a diagram showing another example of a configuration of a transparent region of a power receiving electrode.

The transparent region 222 may be a hole or a transparent conductive member, for example. The transparent region 222 can be formed by cutting out a part of the power receiving electrode 220. The transparent region 222 may be formed by cutting out a part of the power receiving electrode 220 and filling the hole with a transparent conductive material. The shape and size of the transparent region 222 may be set to any shape and size as long as light from the mark 50 enters the imaging device 292. For example, as shown in FIG. 26B, a plurality of transparent regions 222 may be arranged in line in the Y direction. The entire power receiving electrode 220 may be formed from a transparent conductive material.

A conductor having one or more openings (referred to herein as a "shield") may be provided instead of the transparent conductive material 297. The shield may be connected to the ground (i.e., grounded). The size and arrangement of the openings in the shield are set so as to allow light from the mark 50, which is a sensing target, to pass therethrough while shielding the leak electromagnetic field caused by power transfer.

Figure 27:
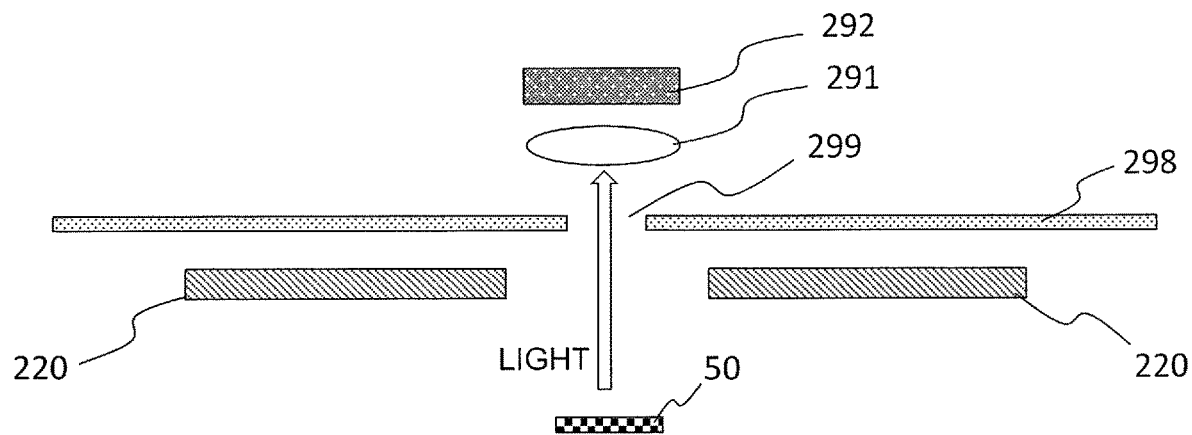
FIG. 27 is a diagram showing an example of a configuration in which a shielding member includes a shield having an opening therein.

FIG. 27 is a cross-sectional view schematically showing a configuration example in which the shielding member 295 includes a shield 298 having one opening 299. The shield 298 is formed from a conductive material. The opening 299 is located on the path of light traveling from the mark 50 to the imaging device 292. Light from the mark 50 passes through the opening 299 and a lens 291 to be detected by the imaging device 292. Note that FIG. 27 does not show the third electrode.

The diameter of the opening 299 is set so as to allow light from the mark 50 to pass therethrough while shielding the leak electric field around the power receiving electrodes 220. Specifically, the diameter of the opening 299 may be set to a value that is less than half the wavelength of the electromagnetic waves having a frequency used for transmitting electric power without affecting the imaging by the imaging device 292. Herein, the "diameter" of the opening 299 means the size of the opening 299 in one of all the directions that are parallel to the surface of the shield 298 in which the size of the opening 299 is greatest. For example, when the shape of the opening 299 as viewed from above is quadrilateral, the diameter of the opening 299 is the length of the longer one of the diagonals. When the shape of the opening 299 is an ellipse, the diameter of the opening 299 is the length of the longer axis.

When the frequency used for transmitting electric power (hereinafter referred to as the "transmission frequency") is 500 MHz, for example, the wavelength in the air of the electromagnetic waves having the frequency is about 60 cm. Therefore, in such a case, the diameter of the opening 299 may be set to be less than 30 cm. The diameter of the opening 299 is set to an appropriate value for the transmission frequency. The smaller the size of the opening 299, the lower the intensity of the electromagnetic waves passing through the opening 299. Therefore, the size of the opening 299 is set so that it is possible to shield the electromagnetic waves of the transmission frequency while ensuring an area needed for light used for imaging to pass therethrough.

In the example shown in FIG. 27, the shield 298 may be implemented by the housing of the electronic device 290 or the transport robot 10. The shield 298 may have a plurality of openings therein.

Figure 28:
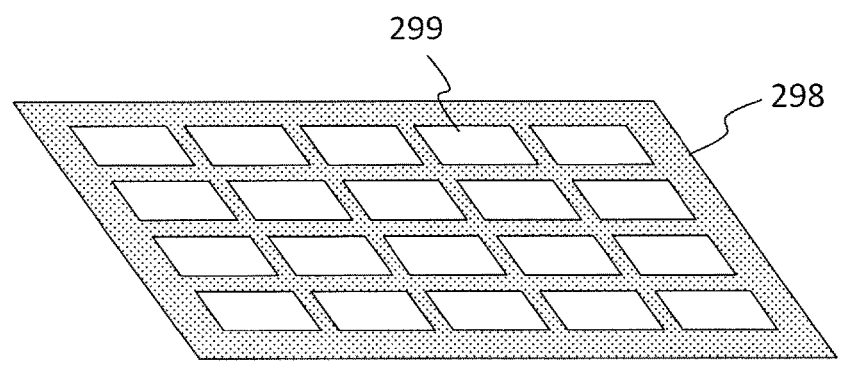
FIG. 28 is a diagram showing another example of a shield.

FIG. 28 is a diagram showing another example of the shield 298. In this example, the shield 298 has a plurality of openings 299 therein. The openings 299 are arranged in a two-dimensional array. The openings 299 may be arranged in a one-dimensional array. The openings 299 do not need to all have the same shape and the same size. The diameter of each opening 299 may be set to such a value that light from the sensing target is allowed to pass therethrough while shielding the electromagnetic waves of the transmission frequency.

The configuration using the shield 298 may be used for applications in which information is obtained from a sensing target using electromagnetic waves other than light. For example, it may be applied, to a system in which an RF-ID or a wireless LAN is used for communication. Furthermore, it may be applied to a configuration in which the shield 298 is used for a sensor using an ultrasonic device.

As an example, assume a case where the transmission frequency is 500 kHz. With an RF-ID, if electromagnetic waves in the 900 MHz band are used, for example, these frequency bands are higher than the transmission frequency. Also with a wireless LAN, if electromagnetic waves in the 2.4 GHz band or the 5 GHz band are used, for example, these frequency bands are higher than the transmission frequency. Therefore, with a shield having a plurality of openings therein, it is possible to allow electromagnetic waves for communication to pass therethrough while suppressing electromagnetic noise caused by power transfer.

Similarly, with a sensing device using an ultrasonic device, it is possible to suppress the influence of electromagnetic noise by using a shield that shields electromagnetic waves caused by power transfer while allowing ultrasonic waves pass therethrough.

With any of the configurations, the size of each opening of the shield 298 may be set so as to allow electromagnetic waves or sound, waves used for sensing to pass therethrough without exposing the antenna or the sound wave source to the electromagnetic waves of the transmission frequency.

Figure 29:
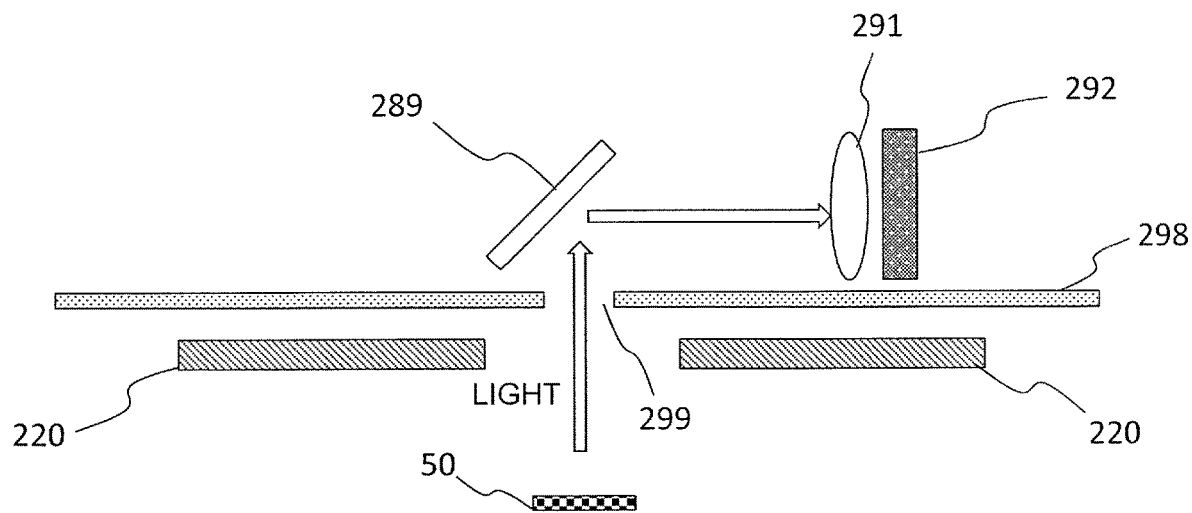
FIG. 29 is a diagram showing a variation of the configuration shown in FIG. 27.

FIG. 29 is a diagram showing a variation of the configuration shown in FIG. 27. In this variation, the electronic device includes a mirror 289 that reflects light from the mark 50 onto the imaging device 292. As shown in the figure, the path of the light or electromagnetic waves from an object is not limited to a straight line, but the path may be altered by a reflector such as the mirror 289. In this example, a transparent conductive member may be arranged instead of the shield 298 having the opening 299.

Figure 30:
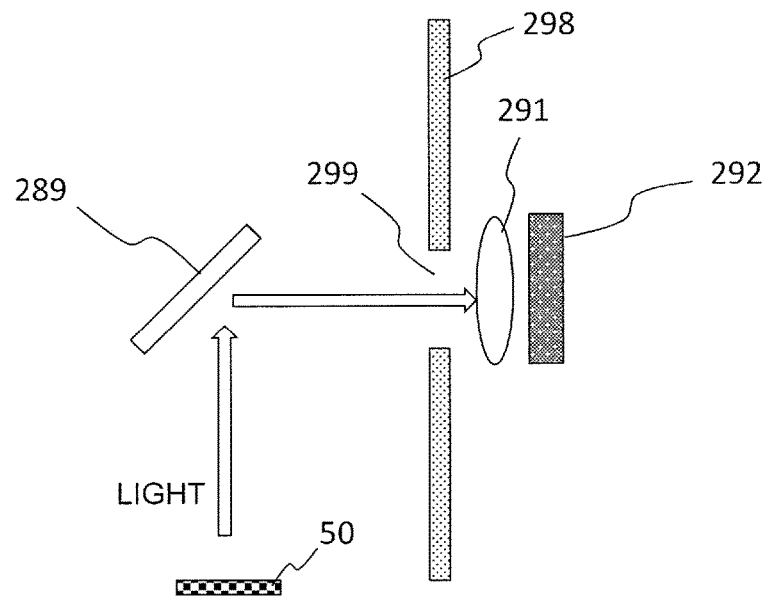
FIG. 30 is a diagram showing another variation of the configuration shown, in FIG. 28.

FIG. 30 is a diagram showing another variation of the configuration shown in FIG. 27. In this variation, the shield 298 having the opening 299 is arranged between the mirror 289 and the imaging device 292. Thus, the position of the opening 299 of the shield 298 may be any position as long as it is on the path of light traveling from the mark 50 onto the imaging device 292. Also in this example, a transparent conductive member may be arranged instead of the shield 298 having the opening 299.

The configuration shown in FIG. 29 and the configuration shown in FIG. 30 may be combined together. For example, a first shielding member may be arranged between the sensing target and the reflector, and a second, shielding member may be arranged between the reflector and the sensing device. Also in a configuration in which no reflector is provided, two or more shielding members may be provided in series with each other. With such a configuration, it is possible to further reduce the influence of electromagnetic noise caused by power transfer.

Next, an example of a vehicle that senses an object different from the mark 50 will be described.

Figure 31:
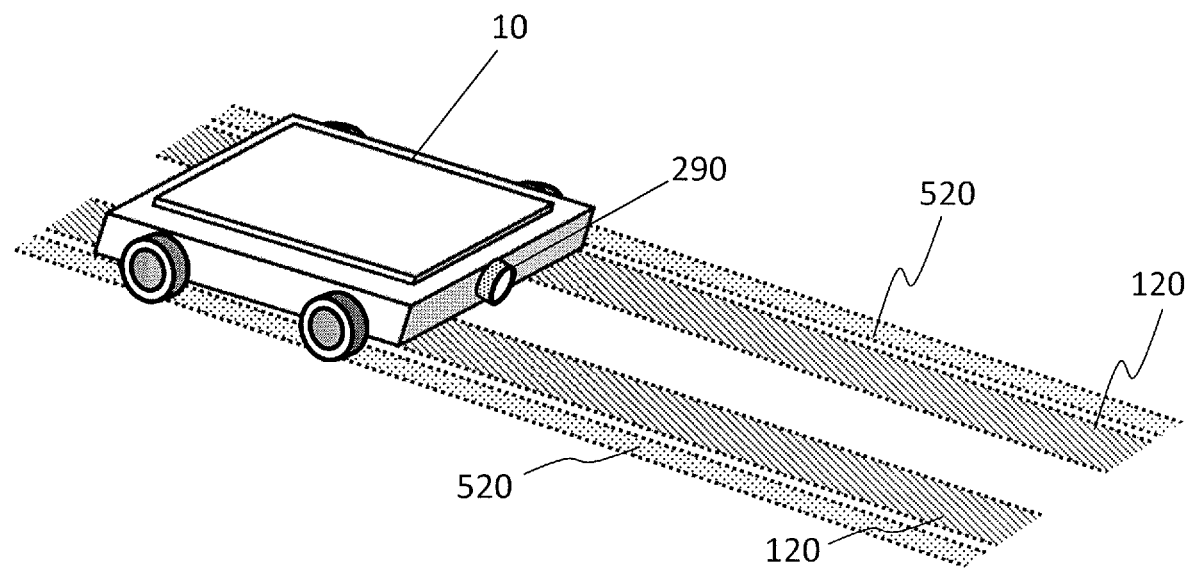
FIG. 31 is a diagram showing an example of a vehicle including a sensor for detecting humans.
Figure 32:
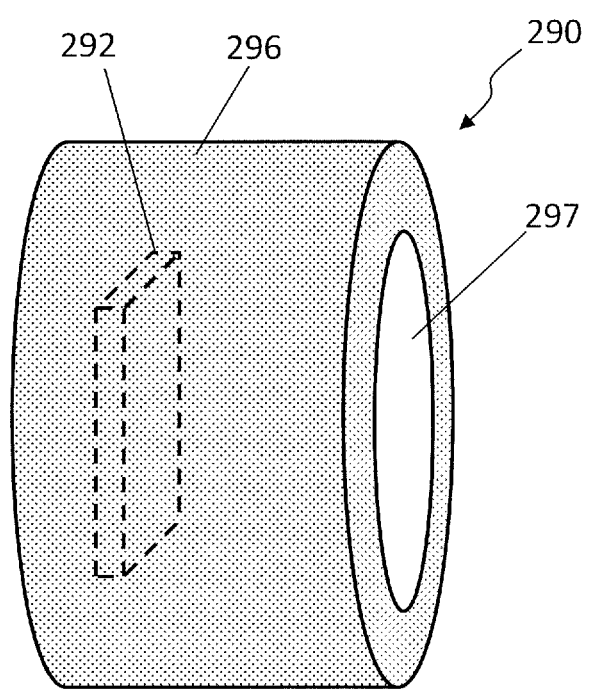
FIG. 32 is a diagram, showing a general configuration of a sensor.

FIG. 31 is a diagram showing an example of the transport robot 10 including a sensor for detecting humans. The transport robot 10 includes the electronic device 290 that functions as a human detection sensor. While the position of the electronic device 290 is on the front of the transport robot 10 in this example, the position of the electronic device 290 may be any position.

FIG. 31 is a diagram showing a general configuration of the electronic device 290. The electronic device 290 includes the imaging device 292, which is a sensing device, the conductive member 296, which functions as a housing, and the transparent conductive material 297. An optical system such as a lens may be arranged between the transparent conductive material 297 and the imaging device 292.

In this example, when a human comes into the vicinity of the power transmitting electrodes 120 while electric power is transmitted, the transport robot 10 detects the human and instructs the power transmitting device to stop or lower the electric power transmission. Since the conductive member 296 and the transparent conductive material 297 are provided, the influence of electromagnetic noise from the electrodes is reduced, thereby improving the human detection precision. At least one third electrode is provided in the vicinity of the electronic device 290. With the third electrode, it is possible to reduce the influence of the electric field generated from the power transmitting electrodes or the power receiving electrodes. When a sufficient electric field suppressing effect is achieved with only the third electrode, the transparent conductive material 297 may be omitted.

Note that the shield having one or more openings described above may be arranged instead of the transparent conductive material 297. A photodetector of a different type may be arranged instead of the imaging device 292.

In the embodiments set forth above, descriptions regarding the electrode unit on the power transmitting side can directly apply also to the electrode unit on the power receiving side. Similarly, descriptions regarding the electrode unit on the power receiving side can directly apply also to the electrode unit on the power transmitting side.

The wireless power transmission system according to any embodiment of the present disclosure may be used as a system for transporting articles inside a factory, as described above. The transport robot 10 functions as a platform track that has a platform where articles are placed and autonomously moves around inside the factory to carry the articles to intended locations. Note however that the wireless power transmission system and the vehicle of the present disclosure are not limited to such an application, but may be used in various other applications. For example, the vehicle is not limited to an AGV, but may be another industrial machine, a service robot, an electric vehicle, a forklift, a multicopter (drone), an elevator, or the like. For example, the wireless power transmission system can be used not only in a factory, but also in a shop, in a hospital, in a house, on a road, on a runway, and in any other place.

As described above, the present disclosure includes electrode units, power transmitting devices, power receiving devices, electronic devices, vehicles and wireless power transmission systems as set forth in items below.

[Item 1]

An electrode unit for use in a power transmitting device or a power receiving device of a wireless power transmission system based on an electric field coupling method, the electrode unit including:

a first electrode to which a first voltage is applied when power is transferred;

a second electrode to which a second voltage is applied when power is transferred, wherein the second voltage has a phase that is different from a phase of the first voltage by a value greater than 90 degrees and less than 270 degrees; and a third electrode spaced apart from the first and second electrodes, the third electrode having a third voltage whose amplitude is less than amplitudes of the first and second voltages when power is transferred, wherein:

the first and second electrodes are arranged along an electrode installation plane; and at least a portion of the third electrode does not overlap the first and second electrodes as viewed from a direction perpendicular to the electrode installation plane.

[Item 2]

The electrode unit according to item 1, wherein as viewed from a direction perpendicular to the electrode installation plane, an area of a portion of the third electrode that does not overlap the first and second electrodes is greater than an area of a portion of the third electrode that overlaps the first and second electrodes.

[Items 3]

The electrode unit according to item 1 or 2, wherein the third electrode does not entirely overlap the first and second electrodes as viewed from a direction perpendicular to the electrode installation plane.

[Item 4]

The electrode unit according to any one of items 1 to 3, wherein at least a portion of the third electrode is coplanar with at least one of the first and second electrodes.

[Item 5]

The electrode unit according to any one of items 1 to 4, wherein the first and second electrodes and the at least a portion of the third electrode extend in the same direction.

[Item 6]

The electrode unit according to item 5, wherein a width of the at least a portion of the third electrode is less than a width of each of the first and second electrodes.

The electrode unit according to any one of items 1 to 6, wherein an area of the third electrode is less than an area of each of the first and second electrodes as viewed from a direction perpendicular to the electrode installation plane.

[Item 8]

The electrode unit according to any one of items 1 to 7, wherein the third electrode is arranged outside a region defined between the pair of the first electrode and the second electrode and another pair of electrodes that oppose the first and second electrodes when power is transferred.

[Item 9]

The electrode unit according to any one of items 1 to 8, including a sheet-shaped structure, wherein:

the first to third, electrodes are inside the sheet-shaped structure.

[Item 10]

The electrode unit according to item 9, wherein:

the sheet-shaped structure is a layered structure including a plurality of layers; and at least two of the first to third electrodes are located in different ones of the plurality of layers.

[Item 11]

The electrode unit according to any one of items 1 to 9, wherein:

the third electrode includes a first portion adjacent to the first electrode, and a second portion adjacent, to the second electrode; and the first, and second electrodes are present between the first portion and the second portion as viewed from a direction perpendicular to the electrode installation plane.

[Item 12]

The electrode unit according to any one of items 1 to 11, wherein:

when power is transferred, the third electrode is connected to a ground terminal of a power transmitting device or a power receiving device in which the electrode unit is provided; and supply of the third voltage to the third electrode is realized by the connection between the third electrode and the ground terminal.

[Item 13]

The electrode unit according to item 12, wherein:

the first and second electrodes and the at least a portion of the third electrode extend in the same direction; and a length between a portion of the third electrode that is connected to the ground terminal and an end of the at least a portion of the third electrode is less than ¼ a wavelength corresponding to a frequency of electric power transmitted.

[Item 14]

The electrode unit according to item 11, wherein the third electrode further includes a third portion that connects together the first portion and the second portion.

[Item 15]

The electrode unit according to item 14, wherein supply of the third voltage to the third electrode is realized by an electromagnetic coupling between the first and third portions and the first electrode and electromagnetic coupling between the second and third portions and the second electrode.

[Item 16]

The electrode unit according to item 14 or 15, wherein:

the first and second electrodes and the first and second portions of the third electrode extend in the same direction;

the third, portion connects together one end of the first portion and one end of the second portion; and the first and second electrodes are located, inside an area that is defined by the first to third portions as viewed from a direction perpendicular to the electrode installation plane.

[Item 17]

The electrode unit according to item 14 or 15, wherein:

the first and second electrodes and the first and second portions of the third electrode extend in the same direction; and on a back side of the first and second electrodes, the third portion connects together a portion of the first portion other than opposite ends thereof and a portion of the second portion other than opposite ends thereof.

[Item 18]

The electrode unit according to any one of items 1 to 17, wherein the third electrode is located between the first and second electrodes.

[Item 15]

The electrode unit according to any one of items 1 to 18, wherein:

one of the first and second electrodes is divided into two portions that extend in parallel to each other;

the other one of the first and second, electrodes is arranged between the two portions; and voltages of the same phase are applied to the two portions.

[Item 20]

A power transmitting device including:

the electrode unit according to any one of items 1 to 19; and a power transmitting circuit for supplying AC power to the first and second electrodes of the electrode unit.

[Item 21]

A power receiving device including:

the electrode unit according to any one of items 1 to 19; and a power receiving circuit for converting AC power received by the first and second electrodes of the electrode unit into DC power or a different type of AC power and supplying the converted power to a load.

[Item 22]

The power receiving device according to item 21, wherein at least a portion of the third electrode is arranged on a housing of the power receiving device.

[Item 23]

The power receiving device according to item 21 or 22, further including an electronic device including a sensing device for obtaining information from a sensing target around a vehicle by using electromagnetic field or ultrasonic waves.

[Item 24]

The power receiving device according to item 23, wherein the sensing device is located between the first and second electrodes as viewed from a direction perpendicular to the electrode installation plane.

[Item 25]

The power receiving device according to item 23 or 24, wherein the sensing device obtains the information from the sensing target by using light in a visible range or an infrared range.

[Item 26]

The power receiving device according to item 25, wherein the sensing device is an imaging device.

[Item 27]

The power receiving device according to item 26, wherein:

the sensing target is a mark including a one-dimensional or a two-dimensional code; and the sensing device captures an image of the mark so as to read information recorded in the code.

[Item 28]

The power receiving device according to item 27, wherein:

the code includes location information; and the sensing device reads the code so as to obtain the location information of the code.

[Item 29]

The power receiving device according to item 25 or 26, wherein:

the sensing target is a human or another obstruction; and the sensing device detects presence of the human or the other obstruction by using the light.

[Item 30]

A wireless power transmission system including:

a power transmitting device including a power transmitting electrode unit; and a power receiving device including a power receiving electrode unit, wherein:

at least one of the power transmitting electrode unit and the power receiving electrode unit is the electrode unit according to any one of items 1 to 19.

[Item 31]

The wireless power transmission system, according to item 30, wherein:

each of the power transmitting electrode unit and the power receiving electrode unit is the electrode unit according to any one of items 1 to 19; and when power is transferred, a capacitance between the third electrode of the power transmitting electrode unit and the third electrode of the power receiving electrode unit is less than each of capacitances between the first and second electrodes of the power transmitting electrode unit and the first and second electrodes of the power receiving electrode unit.

[Item 32]

The wireless power transmission system according to item 30 or 31, wherein:

each of the power transmitting electrode unit and the power receiving electrode unit is the electrode unit according to any one of items 1 to 21; and with the first and second electrodes of the power transmitting electrode unit and the first and second electrodes of the power receiving electrode unit opposing each other, the third electrode of the power transmitting electrode unit and the third electrode of the power receiving electrode unit do not oppose each other.

[Item 33]

A vehicle including:

the power receiving device according to any one of items 21 to 29; and a load that is driven by electric power received by the power receiving device.

[Item 34]

A wireless power transmission system including the vehicle according to item 33 and the power transmitting device according to item 20.

The technique of the present disclosure can be used for any device that is driven by electric power. For example, it can be used for a vehicle such as an electric vehicle (EV), an automated guided vehicle (AGV) or an unmanned, aircraft (UAV).

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fail within the true spirit and scope of the invention.

This application is based on Japanese Patent Applications No. 2017-112572 filed on Jun. 7, 2017, and No. 2018-58115 filed on Mar. 26, 2018, the entire contents of which are hereby incorporated by reference.

What is claimed is:

1. An electrode unit for use in a power transmitting device or a power receiving device of a wireless power transmission system based on an electric field coupling method, the electrode unit including:

a first electrode to which a first voltage is applied when power is transferred;

a second electrode to which a second voltage is applied when power is transferred, wherein the second voltage has a phase that is different from a phase of the first voltage by a value greater than 90 degrees and less than 270 degrees; and a third electrode spaced apart from the first and second electrodes, the third electrode having a third voltage whose amplitude is less than amplitudes of the first and second voltages when power is transferred, wherein:

the first and second electrodes are arranged in a first direction along an electrode installation plane and extend along a second direction that is along the electrode installation plane and perpendicular to the first direction;

the third electrode includes a first portion adjacent to the first electrode, and a second portion adjacent to the second electrode, the first and second portions extending along the second direction;

the first and second electrodes are present between the first portion and the second portion as viewed from a third direction perpendicular to the electrode installation plane;

each of lengths of the first and second electrodes and the first and second portions of the third electrode as measured in the second direction is greater than a dimension of a region defined by the first to third electrodes as measured in the first direction; and wherein the third electrode is placed separately from a housing of the power transmitting device and a housing of the power receiving device.

2. The electrode unit according to claim 1, wherein the third electrode does not entirely overlap the first and second electrodes as viewed from the third direction.

3. The electrode unit according to claim 1, wherein at least one of the first and second portions of the third electrode is coplanar with at least one of the first and second electrodes.

4. The electrode unit according to claim 1, wherein a width of the at least one of the first and second portions is less than a width of each of the first and second electrodes.

5. The electrode unit according to claim 1, wherein an area of the third electrode is less than an area of each of the first and second electrodes as viewed from the third direction.

6. The electrode unit according to claim 1, comprising a sheet-shaped structure, wherein:

the first to third electrodes are inside the sheet-shaped structure.

7. The electrode unit according to claim 6, wherein:

the sheet-shaped structure is a layered structure including a plurality of layers; and at least two of the first to third electrodes are located in different ones of the plurality of layers.

8. The electrode unit according to claim 1, wherein the third electrode further includes a third portion that connects together the first portion and the second portion.

9. The electrode unit according to claim 8, wherein supply of the third voltage to the third electrode is realized by an electromagnetic coupling between the first and third portions and the first electrode and electromagnetic coupling between the second and third portions and the second electrode.

10. The electrode unit according to claim 1, wherein:

one of the first and second electrodes is divided into two portions that extend in parallel to each other;

the other one of the first and second electrodes is arranged between the two portions; and voltages of the same phase are applied to the two portions.

11. A power transmitting device comprising:

the electrode unit according to claim 1; and a power transmitting circuit for supplying AC power to the first and second electrodes of the electrode unit.

12. A power receiving device comprising:
the electrode unit according to claim 1; and
a power receiving circuit for converting AC power received by the first and second electrodes of the electrode unit into DC power or a different type of AC power and supplying the converted power to a load.

13. The power receiving device according to claim 12, further comprising an electronic device including a sensing device for obtaining information from a sensing target around the power receiving device by using electromagnetic field or ultrasonic waves.

14. A wireless power transmission system comprising:
a power transmitting device including a power transmitting electrode unit; and
a power receiving device including a power receiving electrode unit, wherein:
at least one of the power transmitting electrode unit and the power receiving electrode unit is the electrode unit according to claim 1.

15. The wireless power transmission system according to claim 14, wherein:
each of the power transmitting electrode unit and the power receiving electrode unit is the electrode unit according to claim 1; and
when power is transferred, a capacitance between the third electrode of the power transmitting electrode unit and the third electrode of the power receiving electrode unit is less than each of capacitances between the first and second electrodes of the power transmitting electrode unit and the first and second electrodes of the power receiving electrode unit.

16. The wireless power transmission system according to claim 14, wherein:
each of the power transmitting electrode unit and the power receiving electrode unit is the electrode unit according to claim 1; and
with the first and second electrodes of the power transmitting electrode unit and the first and second electrodes of the power receiving electrode unit opposing each other, the third electrode of the power transmitting electrode unit and the third electrode of the power receiving electrode unit do not oppose each other.

17. A vehicle comprising:
the power receiving device according to claim 12; and
a load that is driven by electric power received by the power receiving device.

18. The electrode unit according to claim 1, wherein the first and second portions of the third electrode are two separate electrodes.

19. A wireless power transmission system comprising:
a power transmitting device; and
a vehicle configured to receive power from the power transmitting device while moving along a direction of travel, wherein:
the power transmitting device comprising:
a first power transmitting electrode to which a first voltage is applied when power is transferred;
a second power transmitting electrode to which a second voltage is applied when power is transferred, wherein the second voltage has a phase that is different from a phase of the first voltage by a value greater than 90 degrees and less than 270 degrees; and
a third electrode spaced apart from the first and second power transmitting electrodes, the third electrode having a third voltage whose amplitude is less than amplitudes of the first and second voltages when power is transferred;
the first and second power transmitting electrodes are arranged in a first direction along an electrode installation plane and extend along a second direction that is along the electrode installation plane and perpendicular to the first direction;
the second direction corresponds to the direction of travel;
the third electrode includes a first portion adjacent to the first power transmitting electrode, and a second portion adjacent to the second power transmitting electrode, the first and second portions extending along the second direction;
the first and second power transmitting electrodes are present between the first portion and the second portion as viewed from a third direction perpendicular to the electrode installation plane;
each of lengths of the first and second electrodes and the first and second portions of the third electrode as measured in the second direction is greater than a dimension of a region defined by the first to third electrodes as measured in the first direction; and
wherein the third electrode is placed separately from a housing of the power transmitting device.

20. The wireless power transmission system according to claim 19, wherein:
the vehicle comprises a first power receiving electrode and a second power receiving electrode; and
the vehicle is configured to move along the second direction while keeping the first and second power receiving electrodes opposing the first and second power transmitting electrodes, respectively, and receiving the power from the first and second power transmitting electrodes.

* * * * *